United States Patent
Nelson et al.

(10) Patent No.: US 7,514,263 B2
(45) Date of Patent: *Apr. 7, 2009

(54) CONTINUOUS PROCESS FOR THE PRODUCTION OF COMBINATORIAL LIBRARIES OF MATERIALS

(75) Inventors: James Michael Nelson, Rosevill, MN (US); Robert Stephen Davidson, Edina, MN (US); Jeffrey Jacob Cernohous, Hudson, WI (US); Michael John Annen, Hudson, WI (US); James Robert McNerney, Inver Grove Heights, MN (US); Robert Wade Ferguson, Saint Paul, MN (US); Anthony Robert Maistrovich, Woodbury, MN (US); James Alan Higgins, River Ralls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 118 days.

This patent is subject to a terminal disclaimer.

(21) Appl. No.: 09/824,330

(22) Filed: Apr. 2, 2001

(65) Prior Publication Data

US 2003/0035756 A1 Feb. 20, 2003

(51) Int. Cl.
 *G01N 31/10* (2006.01)
(52) U.S. Cl. ............... 436/37; 436/34; 436/180; 422/129; 422/130; 422/131; 422/134
(58) Field of Classification Search ............ 422/99, 422/100, 102, 104, 129, 130, 131, 134, 137, 422/138, 105; 436/34, 37, 180, 174, 147
See application file for complete search history.

(56) References Cited

U.S. PATENT DOCUMENTS

| 2,915,554 | A | 12/1959 | Ahlbrecht et al. |
| 3,036,997 | A | 5/1962 | Campbell |
| 3,778,393 | A | 12/1973 | Greber et al. |
| 3,804,881 | A | 4/1974 | Bassett et al. |
| 4,086,151 | A | 4/1978 | Stevens et al. |
| 4,346,193 | A | 8/1982 | Warfel ............... 525/52 |
| 4,371,661 | A | 2/1983 | Nicholson ............ 525/53 |
| 4,415,615 | A | 11/1983 | Esmay et al. |
| 4,442,273 | A | 4/1984 | Neiditch et al. ........ 526/88 |
| 4,500,687 | A | 2/1985 | Wolfe |

(Continued)

FOREIGN PATENT DOCUMENTS

DE 32 26 114 A1 2/1983

(Continued)

OTHER PUBLICATIONS

Co-Pending Application: "Continuous Process for the Production of Controlled Architecture Materials," U.S. Appl. No. 09/500,155, filed Feb. 8, 2000.

(Continued)

*Primary Examiner*—Jill Warden
*Assistant Examiner*—Dwayne K Handy
(74) *Attorney, Agent, or Firm*—Sean Edman; Melanie Gover

(57) ABSTRACT

A system is provided wherein a plug flow reactor is used to make combinatorial libraries of materials. Examples of plug flow reactors include stirred tube reactors, extruders, and static mixers.

11 Claims, 1 Drawing Sheet

U.S. PATENT DOCUMENTS

| | | | |
|---|---|---|---|
| 4,572,819 A * | 2/1986 | Priddy et al. | 422/62 |
| 4,599,437 A | 7/1986 | Riederer | |
| 4,739,026 A | 4/1988 | Riederer et al. | |
| 4,883,642 A | 11/1989 | Bisconte | 422/66 |
| 4,985,208 A | 1/1991 | Sugawara et al. | 422/135 |
| 5,143,854 A | 9/1992 | Pirrung et al. | 436/518 |
| 5,144,069 A | 9/1992 | Stern et al. | |
| 5,166,260 A | 11/1992 | Buonerba et al. | 525/52 |
| 5,227,460 A | 7/1993 | Mahabadi et al. | |
| 5,345,213 A | 9/1994 | Semancik et al. | 338/34 |
| 5,356,756 A | 10/1994 | Cavicchi et al. | 430/315 |
| 5,391,655 A | 2/1995 | Brandstetter et al. | 526/64 |
| 5,463,564 A | 10/1995 | Agrafiotis et al. | 364/496 |
| 5,521,095 A | 5/1996 | Wojciechowski et al. | |
| 5,571,655 A | 11/1996 | Mahabadi et al. | |
| 5,587,423 A | 12/1996 | Brandstetter et al. | 525/52 |
| 5,644,007 A | 7/1997 | Davidson et al. | 526/64 |
| 5,804,625 A | 9/1998 | Temperante et al. | |
| 5,985,356 A | 11/1999 | Schultz et al. | 427/8 |
| 6,004,617 A | 12/1999 | Schultz et al. | 427/8 |
| 6,160,060 A | 12/2000 | Holliday et al. | |
| 6,175,409 B1 | 1/2001 | Nielsen et al. | |
| 6,224,832 B1 * | 5/2001 | Moore et al. | 422/134 |
| 6,277,491 B1 | 8/2001 | Sakoda et al. | |
| 6,306,658 B1 * | 10/2001 | Turner et al. | 436/37 |
| 6,489,168 B1 * | 12/2002 | Wang et al. | 436/37 |
| 6,508,984 B1 * | 1/2003 | Turner et al. | 422/65 |
| 6,521,710 B1 * | 2/2003 | Roth et al. | 525/259 |
| 6,531,704 B2 * | 3/2003 | Yadav et al. | 250/493.1 |
| 6,566,461 B2 * | 5/2003 | Freitag et al. | 526/65 |
| 6,577,195 B2 | 6/2003 | Newton | 436/518 |
| 6,586,541 B2 * | 7/2003 | Citron | 526/113 |
| 6,613,870 B1 | 9/2003 | Harder et al. | |
| 6,649,719 B2 | 11/2003 | Moore et al. | |
| 6,737,026 B1 * | 5/2004 | Bergh et al. | 422/130 |
| 6,749,814 B1 * | 6/2004 | Bergh et al. | 422/130 |
| 6,852,781 B2 | 2/2005 | Savu et al. | |
| 6,890,493 B1 * | 5/2005 | Bergh et al. | 422/130 |
| 6,902,934 B1 * | 6/2005 | Bergh et al. | 436/37 |
| 2001/0027234 A1 | 10/2001 | Binder et al. | |
| 2002/0026016 A1 * | 2/2002 | Citron | 526/113 |
| 2002/0099137 A1 * | 7/2002 | Austin et al. | 525/100 |
| 2002/0170976 A1 * | 11/2002 | Bergh et al. | 236/49.1 |
| 2003/0012700 A1 * | 1/2003 | Carnahan | 422/102 |
| 2003/0035917 A1 | 2/2003 | Hyman | |
| 2003/0055295 A1 * | 3/2003 | Flanagan et al. | 568/728 |
| 2003/0236369 A1 | 12/2003 | Komoriya et al. | |
| 2004/0023398 A1 | 2/2004 | Nelson et al. | |

FOREIGN PATENT DOCUMENTS

| | | |
|---|---|---|
| DE | 4235786 | 4/1994 |
| EP | 0 127 236 A1 | 12/1984 |
| EP | 0 428 294 | 4/1991 |
| EP | 0 749 987 B12 | 3/1999 |
| GB | 2295152 | 5/1996 |
| JP | 8-127602 | 5/1996 |
| WO | WO 84/03564 | 9/1984 |
| WO | WO 91/17271 | 11/1991 |
| WO | WO 95/18972 | 7/1995 |
| WO | WO 97/41162 | 11/1997 |
| WO | WO98/36826 | 8/1998 |
| WO | WO 99/32705 | 7/1999 |
| WO | WO 99/42605 | 8/1999 |
| WO | WO99/52962 | 10/1999 |
| WO | WO 99/64160 | 12/1999 |
| WO | WO 00/04362 | 1/2000 |
| WO | WO 00/09255 | 2/2000 |
| WO | WO 00/15653 | 3/2000 |
| WO | WO 00/32308 | 6/2000 |
| WO | WO 01/30873 | 5/2001 |
| WO | WO 01/58962 A1 | 8/2001 |
| WO | WO 02/081079 | 10/2002 |

OTHER PUBLICATIONS

Article: Hanak, "The 'Multiple-Sample Concept' in Materials Research: Synthesis, Compositional Analysis and Testing of Entire Multicomponent Systems," *Journal of Materials Science*, 5, 1970, pp. 964-971.

Article: Gordon et al., "Strategy and Tactics in Combinatorial Organic Synthesis. Applications to Drug Discovery," *Acc. Chem. Res.*, 1996, 29, pp. 144-154.

Article: Sevanian et al., "Inhibition of LDL Oxidation and Oxidized LDL-Induced Cytotoxicity by Dihydropyridine Calcium Antagonists," *Pharmaceutical Research*, vol. 17, No. 8, 2000, pp. 999-1006.

Marc R. Nyden, et al., "Development of a Continuous Flow Flame Test Extruder for Hight-Througyhput Formulation and Screening of Flame Retardants and More Fire Resistant Materials", Fire Safety Developments Emerging Needs, Product Developments, Non-Halogen FR's Standards and Regulations, Proceedings, Fire Retardant Chemicals Association, pp. 1-5, Mar. 12-15, 2000.

* cited by examiner

CONTINUOUS PROCESS FOR THE PRODUCTION OF COMBINATORIAL LIBRARIES OF MATERIALS

FIELD OF THE INVENTION

The present invention relates to a scaleable continuous process for the production of combinatorial libraries of materials in a plug-flow reactor.

BACKGROUND INFORMATION

The use of a combinatorial approach for materials synthesis is a relatively new area of research aimed at using rapid synthesis and screening methods to build libraries of polymeric, inorganic or solid state materials. For example, advances in reactor technology have empowered chemists and engineers to rapidly produce large libraries of discrete organic molecules in the pursuit of new drug discovery, which have led to the development of a growing branch of research called combinatorial chemistry. Robotic driven parallel synthesizers consisting of arrays of small batch type reactors have been designed for such efforts (e.g., Chemspeed, Endeavor, Neptune, FlexChem, Reacto-Stations). These reactors synthesize milligram to gram quantities of materials, which can rapidly be screened or analyzed by various techniques including gas chromatography, FT-IR, and UV-Visible spectroscopy.

The development and use of combinatorial methods to develop new polymeric materials is a topic of considerable current interest. A large portion of the current focus of this material-based research is the synthesis of controlled architecture materials: block, graft, dendritic and functionalized polymers. For example, the production of copolymer emulsions at temperatures well below 100° C. in a batch combinatorial chemistry system capable of evaluating 1,000 polymers/week has recently been demonstrated (see Fairley, P., "Symyx Makes 'Living' Block Copolymer" Chemical Week 1999, 161, No.17, 5th May,1999, p.13)

An important consideration in making these arrays is that batch reactors suffer from poor heat transfer characteristics, which may have a detrimental effect on the materials produced in batch arrays. For example in "living" anionic polymerizations, gelation and increased polydispersity, due to termination reactions or other side reactions, are examples of detrimental effects that can occur as a result of poor heat transfer and mixing. In addition, materials produced in small batch reactors still need to be scaled to an appropriate level for application testing and product qualification, requiring some process development and scale up understanding.

SUMMARY OF THE INVENTION

There exists a need for a readily scalable, economical method that can rapidly produce many combinatorial formulations in quantities appropriate for application development. The present invention provides a new method of preparing combinatorial libraries of chemically-synthesized or blended materials in a high throughput fashion. It allows for library members to be continuously made and collected. It also allows the option of later determining the starting materials for a member by tracing back to the time when the starting materials would have been input.

In one aspect the present invention provides continuous method of making a combinatorial library of materials comprising: providing at least one plug flow reactor, introducing one or more components into the plug flow reactor, introducing or changing over time at least one variable affecting the one or more components to produce a combinatorial library of materials, and optionally evaluating the materials of the library. The method of the invention chan be used to produce polymeric materials, small-molecule materials, blended materials comprising at least one polymeric component, biological materials, and biologically-active materials. The plug flow reactor may be any apparatus that allows materials to pass through it in a plug flow manner, for example, a stirred tube reactor, an extruder, a static mixer, or a stirred tube reactor in tandem with an extruder.

Variable that can be changed when conducting the method include concentration of starting material, type of starting material, pressure in the reactor, temperature profile in the reactor, amount of energy supplied to a reaction zone, type of energy supplied to a reaction zone, type of component mixing, degree of component mixing, residence time, and where and when additional components are introduced into the plug flow reactor. Other variables include physical mixing of components and chemical reaction of components. The variables may be changed in a continuous manner or a stepwise manner. Examples of a plug flow reactor (PFR) include a stirred tubular reactor (STR), an extruder, or a static mixer reactor. The ability to control feed flows, feed locations, and compositional variations in a PFR provides an opportunity to produce a variety of compositions in a continuous, economical, and scalable fashion. A major advantage of producing a combinatorial library of materials in a PFR reactor is that different library components need only be separated in time. They do not need to be physically separated.

As used herein:

"actinic radiation" means electromagnetic radiation, preferably UV and IR;

"alloy" means a homogeneous (on a molecular scale) mixture of components;

"axial mixing" means mixing in a direction parallel to the overall direction of flow in a reactor;

"blend" means a homogeneous or heterogeneous (on a macro scale) mixture of components;

"continuous" means generally that reactants enter a reactor at the same time (and, generally, at the same rate) that polymer product is exiting the same reactor;

"energy" means actinic radiation, thermal energy, and electron beam;

"polydispersity" means weight average molecular weight divided by number average molecular weight; polydispersity is reported as a polydispersity index (PDI);

"living anionic polymerization" means, in general, a chain polymerization reaction that proceeds via an anionic mechanism without chain termination or chain transfer. (For a more complete discussion of this topic, see *Anionic Polymerization Principles and Applications*. H. L. Hsieh, R.P. Quirk, Marcel Dekker, NY, N.Y. 1996. Pg 72-127):

"living end" means a reactive site on a polymer for further addition of monomer;

"temperature-sensitive monomer" means a monomer susceptible to significant side reactions as the reaction temperature rises;

"starbranched polymer" means a polymer consisting of several linear chains radiating from junction points (See *Anionic Polymerization Principles and Applications*. H. L. Hsieh, R.P. Quirk, Marcel Dekker, NY, N.Y. 1996. Pg 333-368);

"combinatorial" means combining two or more components and incrementally changing one or more variable(s) that can affect the component(s) or how the components interact;

"controlled architecture material" means a polymer with a designed topology (linear, branched, star, comb, network), composition (block copolymer, random copolymer, homopolymer, graft copolymer, tapered or gradient) or functionality (end, site specific, telechelic, multifunctional, macromonomers);

"block" means the portion of a polymer chain in which all the neighboring monomer units (except at the transition point) are of the same identity, e.g., AAAAAABBBBBB is a diblock copolymer comprised of A and B monomer units;

"plug" means a theoretical slice of a reaction mixture cut in a direction perpendicular the overall direction of flow in a reactor;

"plug flow reactor (PFR)" means a reactor that ideally operates without axial mixing (see An Introduction to Chemical Engineering Kinetics and Reactor Design; Charles G. Hill J. Wiley and Sons 1977, p. 251)

"radial mixing" means mixing in a direction perpendicular to the overall direction of flow in a reactor;

"residence time" means the time necessary for a theoretical plug of reaction mixture to pass completely through a reactor;

"reaction zone" means a portion or portions of a reactor or reactor system where at least one specific interaction of components occurs such as physical reaction, e.g., mixing, or a chemical reaction; it may also refer to one or more portion(s) of a reactor that is independently controllable as to conditions such as temperature;

"temperature profile" means the temperature or temperatures experienced by a reaction mixture plug over time as it moves through a reactor (For example, if the temperature is constant through the reactor, the temperature profile will have a zero slope; if the temperature increases through the reactor, the profile will have a positive slope);

"α-olefin monomer" means a straight chain or branched 1-alkene;

"poly(α-olefin)" means the polymerization product of one or more a-olefin monomers; and "inherent viscosity" means the viscosity calculated according to the formula $\ln(V_{rel})/C$ where ln is the natural logarithm function, $V_{rel}$ is the relative viscosity of a dilute polymer solution (i.e., the ratio of the viscosity of the solution to the viscosity of the solvent), and C is the concentration of the polymer solution (see also pages 46-50 of Sorenson et al., "Preparative Methods of Polymer Chemistry," 2d ed., New York (1968)).

An advantage of at least one embodiment of the present invention is that a plug flow system may be run as a continuous process. Accordingly, libraries formed with this system can have members with masses greater than members made in confined volumes, e.g., to the size of microtitre plates, and can be made at higher process rates.

An advantage of at least one embodiment of the present invention is the ability to scale libraries of polymerizations from laboratory scale quantities to production-scale quantities.

An advantage of at least one embodiment of the present invention is that multiple reagents can be added along the reactor length with ease.

An advantage of at least one embodiment of the present invention is that the possibility of exposing the reactor system to potential contaminants is reduced (compared to using a batch reactor) due to the ability to continuously feed reactants through stable, enclosed purification and feed systems.

An advantage of at least one embodiment of the present invention is that the temperature of the reaction mixture can be controlled to such an extent that side reactions are minimized, thereby providing a product with a narrow polydispersity. This is especially advantageous when temperature-sensitive materials are used.

DETAILED DESCRIPTION

Figure 1:
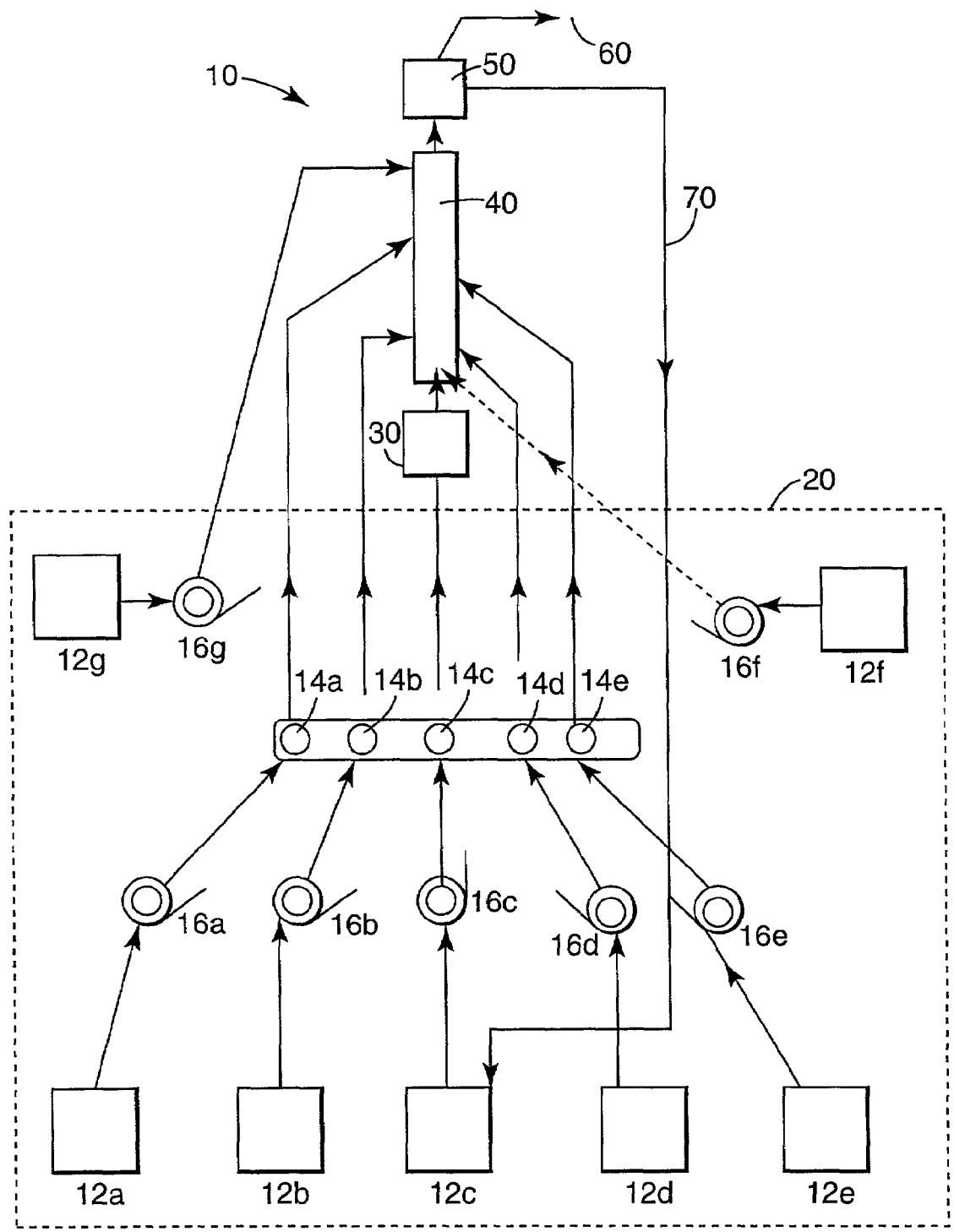
FIG. 1 is a schematic representation of an exemplary reaction system useful for carrying out the polymerization process of the present invention.

The present invention provides methods of making a combinatorial library of materials using a plug flow reactor. "Plug flow" characterizes the manner in which materials move through a reactor. Due to the configuration and/or operation of the reactor, any particular selected plug of material traversing the reactor has minimal axial mixing with an adjacent plug of material even though there will be radial mixing within the plug. This aspect of the reactor allows samples to be continuously and sequentially made with different starting materials or under different processing conditions even though the samples may not be physically separated. Such a system provides many operating advantages such as the ability to make many samples, including those obtained under nonsteady state conditions, and no "down time" when materials or operating conditions are changed. This is because operation does not have to be stopped to change the composition of, or conditions of making, the individual samples. Changes can be made while the plug flow reactor is operating. Samples can be continuously collected as they exit the plug flow reactor. Additionally, one only needs to know the time that particular starting materials are added (or the time at which another change took place), the residence time of the material passing through reactor (typically the flow rate), and the time a particular sample is collected to be able to collect samples and later determine their starting materials or the operating conditions they were subjected to.

An advantage of a combinatorial approach to materials synthesis with a plug flow reactor (PFR) includes the ability to vary components of a controlled architecture material without stopping the polymerization process. The material libraries synthesized may comprise any number of members, depending on how many factors are varied during the operation of the reactor.

A particular sample can be traced from the time it enters the reaction system to the time it leaves the system, based on the flow rate of the materials through the system. The time a sample remains in the system is referred to as its residence time. When the residence time and the time the raw material enters the reactor are known, it can be determined when the sample will exit the system. With this information, the resulting material can be matched up with the starting materials and with changes in process conditions or composition additions made as the material flowed through the reactor. Inline analysis is not required to determine where different plugs of materials are to be collected. Only knowledge of the residence time of a particular interaction is needed to collect distinct plugs after a variable has been changed. However, reactor systems could be interfaced with on-line detection capabilities (UV, IR, Raman, Viscometers) if desired.

A combinatorial library of materials generally refers to a group of related samples of materials wherein each sample is different in some way from the other samples. The difference maybe, e.g., the type of components, amount of components, or conditions to which the sample is subjected, such as temperature and pressure. The ability to rapidly and easily vary a number of aspects of the PFR system, especially while it is being continuously operated, can substantially increase the scope and number of different samples in a library compared to libraries made by conventional combinatorial methods. Unlike typical combinatorial synthesis approaches, the process of the present invention provides the capability to change or adjust the reaction conditions as well as the length of time to which each sample is subjected to the reaction conditions. The process of the invention also makes it possible for instantaneous addition to, or alteration of, individual samples during the reaction process. For example, additional reactive components may be added at various points along the PFR path.

Changes to the plug flow reactor system may be made in a variety of ways. For example, if the effect of an amount of a particular component is being studied, the amount added may be varied. The variation may be done in a linear or stepwise manner. If the type of component being added is being studied, different types of components may be sequentially added at the entrance of the PFR, or at some particular downstream point.

Operating conditions, such as pressure, or energy exposure may also be changed for only a particular sample or set of samples. For example, a section of the reactor, or the entire reactor, may be cooled while some sample(s) pass through, then the temperature may be raised for subsequent sample(s). Alternatively, a condition can be continuously varied and the resulting material continuously analyzed, even if steady state conditions are not reached.

A plug flow system will also easily allow for changing more than one component or operating condition at a time. In addition, a plug flow reactor provides the advantage of being able to control the size of a particular sample. With a plug flow system (though not necessarily the same system) sample sizes could range from, e.g., milligram to multikilogram, or whatever amount is desired. This flexibility can allow for appropriately-sized samples to be made based on the intended screening method.

Within the PFR, chemical or physical reactions can occur as a sample passes through a reaction zone. A reaction zone may be the entire length of the PFR, or may be limited to a particular section of the PFR. A reaction zone may be used to subject a sample to at least one of, e.g., heat, cold, UV radiation, e-beam irradiation, pressure, or vacuum. The duration for which each sample is subjected to reaction conditions may be controlled by adjusting the length and/or diameter of the reaction zone(s) or the rate at which components pass through the reaction zone. The samples may be collected in separate or adjoining containers and can be labeled and individually archived for subsequent or further reaction or analysis.

Once the sample has been removed from the reaction zone and the chemical and/or physical reaction has taken place, the sample can be analyzed using techniques such as IR, far IR, V, visible or Raman spectroscopy, refractive index, acoustical measurement, compression testing, viscometry, light scattering, nuclear magnetic resonance (NMR), gel permeation chromatography (GPC), differential scanning calorimetry (DSC), thermogravimetric analysis (TGA), dynamic mechanical analysis (DMA), x-ray diffraction (XD), and mass spectral analysis (MS), impedence measurements, ultrasonics, and the like.

Plug Flow Reactor System

A. Reaction Mixture

The present invention allows for a wide range of reaction chemistries. Reactions can be based on chemical or physical reactions to form compounds, polymers, small molecule materials, blends, alloys, biologically-active species, or biological species. Many of the reactions can be controlled by the type of energy supplied in a reaction zone (actinic, thermal, e-beam, etc.) or the reactivity of individual components.

At least one aspect of the invention can be used to produce chemical compounds and biological and biologically-active species using various techniques, such as solution reactions in which the product of the reaction remains soluble in the reaction medium; suspension reactions, in which the product of the reaction is insoluble, and is suspended, in the reaction medium; or two-phase reactions in which the reactants reside in separate phases. In the latter type of reaction, the reaction takes place at the interface of the separate phases. Compounds can be produced by these techniques as is known in the art. See, for example, European patent W095/18972 "Systematic modular production of aminimide- and oxazolone based molecules having selected properties" and European patent WO 91/17271 "Recombinant library screening methods".

Organic and organometallic reaction types that can be used to make combinatorial libraries per the present invention include, e.g., the following: substitution (nucleophilic, electrophilic); ring-opening,;esterification; transesterifications; transition metal catalyzed; aminations; reductions; oxidations; halogenations; enzymatic induced; photochemical-, sonochemical-, or microwave-induced; ultrasound; hydrolysis; Wittig; Heck; Michael addition; Grignard; hydrosilylation; Susuki coupling; dehydrocoupling; cycloaddition; decarboxylation; dehydrohalogenation; hydroformylation; epoxidation; oxidative addition; reductive elimination; ligand displacement; hydroboration; disproportionation; addition of nucleophiles to coordinated ligands; oxidative decarbonylation; carboxymetallation; and photodealkylation. See March, "Advanced Organic Chemistry," John Wiley and Sons, 1992, NY, N.Y.

Polymer synthesis methodologies suitable for the present invention include any step-growth (e.g., polycondensations) or chain-growth (e.g., anionic, cationic, free-radical, living free radical, coordination, group transfer, metallocene, ring-opening, and the like), polymerization mechanism (See Odian, "Principles of Polymerization" $3^{rd}$ Ed., Wiley-Interscience, 1991, NY, N.Y). These methodologies can be accomplished using polymerization techniques analogous to those used for the synthesis of chemical compounds and biologically-active species, for example, solution polymerization, and suspension polymerization. A further useful method is emulsion polymerization in which the final products are small enough to form a latex or dispersion.

In a polymerization process of the present invention, the reaction mixture comprises at least one monomer. In some embodiments, the reaction mixture further comprises an initiator or catalyst system and in further embodiments, at least one solvent. In embodiments that require an initiator or catalyst, these generate a reactive species that, in the presence of a suitable monomer, facilitates polymerization. In embodiments that utilize a solvent, the solvent system facilitates mobility of the monomers, initiator system, and the produced polymer as well as serving as a partial heat sink.

The invention allows the synthesis of homopolymers; random copolymers; block copolymers; star-branched homo-, random, and block copolymers; and end-functionalized polymers by using appropriate polymerization techniques.

Blends and alloys can also be made in a plug flow reactor. These may be made by physically mixing components. Resulting combinatorial libraries could comprise products comprising different component types and amounts, mixed under different operating conditions, etc. The blends or alloys may comprise, for example, polymers mixed with inorganics such as silica, carbon black, or clay forming nanocomposite type materials or other reinforced materials.

Inorganic reactions are also amenable to this type of processing. For example, alkoxy silanes can be polymerized to form particulate precipitates or liquid-phase polymers, depending on the conditions. Libraries of such materials could be prepared by varying temperature and/or reaction mixture composition throughout the residence time of the reactor. Surface functionalization of suspended particulates or liquid-phase inorganic polymers is also possible. For example, it is known that the conformation of organic polymers on inorganic surfaces is a strong function of adsorption conditions. In this example, libraries of organic/inorganic composite materials can be prepared by changing the profile of adsorption conditions along the length of the reactor (e.g., temperature, mixture composition).

Libraries of biologically-active materials and biological materials may also be made in the present invention.

Examples of biologically-active materials and biological materials include peptides, nucleotides, sugars, e.g., polysaccharides, enzymes, bacteria, and amino acids.

B. Optional Purification and Delivery to Reactor

A system for making a combinatorial library of materials per the present invention is exemplified by FIG. 1. Referring to FIG. 1, reaction system 10 includes reaction mixture delivery system 20, optional heat exchanger 30, reactor 40, optional devolatilization mechanism 50, outlet 60, and optional recycle stream 70, which allows any residual solvent to be recycled through the system. Reaction mixture delivery system 20 comprises component feed supply units 12a-12g, optional purification units 14a-14e, and optional pumps 16a-16g.

Optional Purification

As FIG. 1 shows, initially components are impelled from one or more of feed supplies 12a-12e to optional purification units 14a-14e via optional pumps 16a-16e and then into reactor 40.

The number of pumps and the configuration of the system, e.g., whether a purification unit is needed, will depend on the number and types of components being used. For example, some components that may be in the reaction mixture such as alkyl lithium, Ziegler Natta, or metallocene reagents, which may be used as initiators or catalyts, are notoriously sensitive to a variety of deactivating species including, inter alia, $H_2O$ and $O_2$. For small molecule reactions, such as in a Grignard reaction, materials and reagents must be thoroughly dried through use of purification units, such as 14a-14e. Therefore, when sensitive reagents are used, care must be taken to remove or exclude such deactivating species from the components and any solvents or additives. This removal is performed by purification units 14a-14e.

Preferred purification methods depend on the nature of the adverse specie being removed and may include sparging the components with an inert gas (e.g., $N_2$) and passing the combined stream of the components and any solvent through one or more purification columns. Such columns are packed with particles that selectively remove dissolved deactivating species. For example, molecular sieves and a variety of desiccants can remove $H_2O$ while activated copper can remove $O_2$ from fluids coming into contact therewith. Those skilled in the art are aware of the importance of removal of $H_2O$ and $O_2$ from certain reaction mixture components as well as numerous ways of accomplishing the same.

In some polymerization reactions, having low water and oxygen concentrations, i. e., below 10 ppm, ensures that very little initiator or "living" polymer chain is deactivated. Polymerization inhibitors may be removed from monomers by treatment with various inorganic adsorbants, such as basic alumina ($Al_2O_3$), or zirconia ($ZrO_2$), or organic polymers such as ion exchange resins, as is known in the art. After purification, components may be mixed at the inlet of reactor 40 or introduced through separate inlets and mixed at some point downstream from the inlet end of reactor 40.

Delivery to Reactor

In most instances, for example, in most polymerizations, small molecule reactions, biological reactions, or biologically active reactions, components may be fed directly from feed supplies 12f and 12g, to reactor 40, for example, by pumps 16f and 16g, without passing through a purification unit 14. Because initiators or catalysts can be air-sensitive, if they are used it may be desirable to feed the initiator directly to the reactor to avoid excess processing that could introduce air into the initiator supply.

For polymerizations, initial reaction mixture components (typically monomer(s), optional solvent(s), and initiator(s)) are impelled from component feed supply units, e.g., 12b, 12c, and 12d for the monomer/solvent mixture and 12f for the initiator by pumps 16b, 16c, 16d, and 16f, respectively. Other monomers, branching agents, quenching agents and solvents can be added to the reactor 40 at some point further downstream from the initial charge of monomers. For example, additional solvents and monomers may be added from component feed supply units 12a and 12e via pumps 16a and 16e, respectively. The feed supplies will pass through a corresponding purification unit 14, if present in the system.

Although a pressurized feed (i.e., a pressurized tank with a control valve) can be used for each component, the components preferably are impelled by pump mechanisms. For oxygen- and moisture- sensitive reactions, a wide variety of pump designs can be useful in the present invention as long as the pump seal is sufficient to exclude oxygen, water, and other initiator-deactivating materials. Examples of potentially useful pumps include gear pumps, diaphragm pumps, centrifugal pumps, piston pumps, and peristaltic pumps.

Some initiator systems are delivered to reactor 40 in the form of a slurry, i.e., a suspension of small particles in a solvent. Such slurry initiator systems can settle in feed supply unit 12f and in pump 16f unless care is taken. A mechanism to keep the initiator system well mixed in feed supply unit 12f is preferred. Examples of such mechanisms include multiple agitator blades and a pump-around loop. Additionally, such initiator systems can be impelled to reactor 40 by a pump 16f that can easily handle slurries. Examples of suitable pumps includes peristaltic, reciprocating piston pump, and diaphragm pumps. Tubing used to transport the reaction mixture components to reactor 40 from 12a-12g are preferably capable of handling high pressure and of substantially excluding materials capable of deactivating the initiator being used, e.g., water and oxygen. Useful tubing materials include stainless steel, polypropylene, polyethylene, and polytetrafluoroethylene. When a peristaltic pump is used as one of pumps 16a-16g, the tubing preferably is a fluoroelastomer.

The rate at which pumps 16a-16g impel the reaction mixture components to reactor 40 can be adjusted so the residence time of the reaction mixture in reactor 40 is at or near a desired value.

C. Reactor

Reactor 40 can be any type of reactor or reactor design that allows for essentially plug flow of a reaction mixture. The PFR can be simple or complex, e.g., it could be a constant temperature static mixer or a jacketed ultraviolet irradiated variable temperature stirred tubular reactor.

The reactor preferably has multiple downstream feed injection points and preferably has temperature control. STRs are preferred. The ability to add reagents at numerous points along the reaction pathway in a STR makes the STR well suited for a variety of reactions. The type of reactor used should be such that the residence time is sufficient to allow the desired chemical or physical interaction of components to occur.

Prior to being used in the process of the present invention, it may be desirable to sweeten reactor 40 depending on the chemistry being employed. Commonly sweetening is accomplished by filling reactor 40 with a dilute solution of initiator or catalyst and allowing it to stand for, e.g., about 24 hours. Thereafter, a gaseous sparge and suitable anhydrous solvent can be used to remove the sweetening mixture.

Before reaching reactor 40, the reaction mixture components optionally can pass through heat exchanger 30. Optional heat exchanger 30 is used when reactor 40 is to be run at a temperature above or below the temperature of the reaction mixture components prior to being introduced into reactor 40. For example, when the first section of reactor 40 is maintained at or near a temperature of 50° C., it may be preferable to have the reaction mixture enter the first section of reactor 40 at or near 50° C. Reactor 40 can be surrounded by a jacket containing a circulating heat transfer fluid (e.g., water, steam, liquid nitrogen, etc.) which serves as the means to remove heat from or add heat to reactor 40 and the contents thereof. To aid in this temperature control, temperature sensing devices (e.g., thermometers and/or thermocouples) can extend into reactor 40 to measure the temperature of the reaction mixture passing thereby. Based on the output of the temperature sensing devices, the temperature and circulation rate of the heat transfer fluid contained in the jacket(s) can be adjusted manually or automatically (e.g., by means of a computer controlled mechanism).

Additionally, at least a portion of reactor 40 can be enclosed by a shroud. Between the exterior of reactor 40 and the shroud is maintained an environment that effectively prevents ignition of any flammable or combustible materials that might be present in or near reaction system 10. Shrouded reactors are more fully described in U.S. Pat. Nos. 5,814,278, and 5,882,604, which descriptions are incorporated herein by reference.

By dividing reactor 40 into sections or zones and individually controlling the temperature of each zone, the reaction mixture can be made to encounter a temperature profile. For example, each zone of reactor 40 can be maintained at the same (or nearly the same) set temperature, thus ensuring that the reaction mixture encounters a steady (zero slope) temperature profile. This can be done by having separate jackets around each zone or having some other means to independently control the temperature of each section. Cyclic temperature profiles also are possible. Alternatively, each successive section of reactor 40 can be maintained at a temperature higher (or lower) than the previous section, thus ensuring that the reaction mixture encounters a rising (or falling) temperature profile. If desired, during the course of an ongoing physical or chemical interaction, the temperature profile can be changed by changing the temperature of one or more sections.

In addition to temperature control, an essential feature of reactor 40 is the capability to impel, from the input end of reactor 40 to its output end, in an essentially plug flow manner, the reaction mixture contained therein. By "essentially plug flow" is meant that eddies and dead spots, where reaction mixture can be delayed in its path through reactor 40, and short circuits to the reactor outlet, which allow the reaction mixture to pass too quickly through reactor 40, are minimized. The manner in which a reaction mixture is impelled through reactor 40 can be by an external means such as a pressure feed (e.g., a pump) or by an internal means (e.g., a screw in an extruder). Plug flow can be assisted by radial mixing means (e.g., radial paddles in a STR).

One embodiment of reactor 40 is a stirred tubular reactor (STR), which may consist of a series of cylinders joined together to form a tube. Down the center of this tube, the STR may have a shaft having a plurality of paddles radiating therefrom extending along the primary axis of the tube. (Each cylinder can be jacketed as described previously.) As an external drive causes the shaft to rotate, the paddles stir the reaction mixture and assist in heat transfer. In addition, the paddles can be designed such that they assist the pumps and/or pressure feed systems in propelling the reaction mixture through the tube. STR designs are known to those of skill in the art.

The STR tube can have a volume ranging from a fraction of a liter to several hundred liters or more depending on the number and radii of the cylinders used. The cylinders can be made of glass, tempered glass, various stainless steels, glass-lined steel, or any other material that is nonreactive with a reaction mixture passing therethrough, can exclude potential initiator deactivating materials (e.g., atmospheric $O_2$ and $H_2O$) from the interior reaction zone, can transfer heat, and can preferably withstand elevated pressure. Preferred materials include 316 L stainless steel and low coefficient of expansion-type glass (e.g., PYREX glass, available from Corning Glass Works; Corning, N.Y.). The cylinders can be joined by means of various types of gaskets and flanges. Although the tube can be horizontal or angled, it preferably is slightly angled upward from its input end to its output end so as to ensure that any inert gas in the STR can escape through the outlet.

The shaft can be made from a variety of inert metals, preferably stainless steel. When a corrosive initiator such as alkyllithium is to be used in the STR, the shaft preferably is made from a corrosion resistant stainless steel (e.g., 316 L stainless steel).

When the shaft is hollow, it can be cooled or heated (if desired). This can be accomplished by running a heat transfer fluid, such as water, through it.

To assist in maintaining essentially plug flow through an STR, the paddles can be designed so as to minimize reaction mixture build-up on the paddles and shaft. Build-up often occurs in stagnant regions, which are normally located on the walls of the tube or on the downstream surfaces of paddles, and can result in reduced heat transfer and plugging of the STR. Because STRs are cleaned less frequently than batch reactors (and because long term continuous operation is desirable), build-up can result in a loss of residence time. Having to rid an STR of build-up can result in a loss of production time and the introduction of solvents into the STR can deactivate catalyst during future runs. Build-up and the problems resulting therefrom can be minimized by proper paddle design.

Optimization of paddle design can involve the use of cylindrical and/or streamlined designs as well as providing for narrower wall clearances toward the outer end of the STR. (See the Examples section for a description of a preferred type of paddle configuration.) Use of paddles with flexible tips (e.g., made from a polymer such as polytetrafluoroethylene) can assist in scraping the walls of the tube. Alternatively, build-up can be minimized by periodically alternating the direction of paddle rotation. Direction can be alternated every few seconds or minutes (or whatever time frame seems to best inhibit build-up with a particular reaction mixture).

Where a gaseous monomer is used, the STR tube preferably is made from a very strong material (e.g., stainless steel) that can withstand the elevated pressure necessary to assure solubility of the gaseous monomer.

An STR is best suited for solution viscosities of less than about 50 Pa-s (50,000 centipoise) Solution or bulk polymerizations can be performed at 50-100 wt % monomer. When more viscous materials are produced, typically 25-50 wt % monomer is more suitable.

Another embodiment of reactor 40 is an extruder. Extruders can typically handle high solids, high viscosity materials better than STRs and static mixers. When a polymerization reaction is desired, high solids loadings of typically 80-90 wt % monomer having average molecular weights of 1,000 to 10,000 can be used. Extruders are broadly classified as single screw and multi-screw, with twin screw being the most common version of the latter. Multi-screw extruders can be further classified according to the relative direction of the screws, i.e., counter-rotating (where the screws rotate in opposite directions) and co-rotating (where the screws turn in the same direction). Counter-rotating twin-screw extruders can be further subclassified according to the manner in which the flights (i.e., the grooves) of the two extruders interact. In "intermeshing" units, the flights of one extruder alternate with those of the other in such a manner that very little of the material in one flight can mix with that in the other, whereas, in "tangential" units, the flights of the two screws are aligned (i.e., matched) or staggered so as to provide for increased volume and longer reaction times. Regardless of the number of screws, the direction that they turn, or the arrangement of the flights therein, any extruder design that allows for essentially plug flow of the reaction mixture can be used as reactor 40; nevertheless, a counter-rotating twin-screw extruder is the preferred type of extruder.

Extruders are commonly available in a variety of sizes, with screw diameters ranging up to about 135 mm. (Even larger versions might be available on a special order basis.) Modular units also are available. The length of the extruder barrel preferably is of sufficient length to allow for the desired interaction to occur whether it be mixing, conversion from monomer to polymer, or some other interaction. For example, for Zeigler Natta polymerizations, a length-to-diameter ratio of 60:1 (with a screw speed of 50 rpm, which can provide a residence time of about 8.5 minutes) has been found to allow for approximately 95% conversion at 50° C. at about 40-45 ppm Zeigler Natta catalyst, and for approximately 95% conversion at 100° C. at about 10 ppm Zeigler Natta catalyst.

Typically, extruder barrels and screws are made from metal alloys (e.g., high chrome steel alloy) with a variety of hardness levels and resistances to corrosion available. Usually the screw(s) is/are made from an alloy that is slightly softer than that used in the barrel. Where the screw(s) is/are hollow, a cooling solution (e.g., chilled water or chilled acetone) can be pumped therethrough to assist in heat transfer out of the reaction mixture (i.e., the screw itself can be cooled, or heated).

The screw(s) is/are typically driven by one or more motors. The motor(s) and the oil pump for the transmission preferably are manufactured so as to be explosion proof, are located away from the extruder in a purged cabinet, or are used in the shrouded system discussed previously.

Where a modular extruder unit is used, the screw configuration can be customized simply by joining various sections. In practice, this has been found to be advantageous. For example, at the inlet end of the extruder, large flight advance elements (i.e., a fast pitch) can be used as the large space between flights, which aids in keeping the flights clean. Near the outlet end of the extruder, a slow pitch element can be used to limit the speed at which reaction mixture proceeds through the extruder. To increase the internal volume of an extruder (and to increase residence time), a section with a counterflight screw design can be used. Such sections can be alternated with "regular" flight sections to provide good pumping while increasing the amount of reaction mixture in the extruder at any given time. Other possible element combinations will be readily apparent to those skilled in the art.

When the components introduced into the input end of an extruder are not sufficiently viscous to keep from slipping past the screw, a pressure feed may be used. This is accomplished with aforementioned pumps 16, 16a, and 16b or with a simple pressurized feed tank.

When an extruder is used for a polymerization reaction, a port can be included in the barrel near the end of the extruder, preferably at or beyond the point where the percent conversion of monomer to polymer has reached 95% (e.g., just before the slow-pitch screw segment), to allow a vacuum to be applied to the interior of the extruder. Under this port, a multiple start screw segment, preferably a triple start screw segment, may be used to minimize the amount of reaction mixture in a given flight (to prevent polymer product from plugging the vacuum port(s)). This type of vacuum can assist in removing unreacted monomer from the reaction mixture. Additionally, a variety of residence times can be achieved by varying the speed of the extruder screw(s).

At the input of the extruder or at some point downstream from the input end but prior to the vacuum port or slow pitch screw segment, other inlet ports can be included in the barrel of the extruder. Through these inlets can be introduced one or more additional components.

When a gaseous comonomer is used for a polymerization reaction, it preferably is introduced into the extruder after the entry port for a liquid monomer or solvent. However, the gaseous monomer preferably is not fed into the system until after some of the liquid monomer has been introduced and allowed to react to form a "polymer plug", which acts to keep the gaseous monomer from venting out the outlet or the vacuum port. Alternatively, the gaseous monomer may be in a liquid solvent. The partial pressure of the gaseous monomer within the extruder is maintained at a level sufficiently high to keep the gaseous monomer soluble in the liquid monomer or solvent.

Yet another embodiment of reactor 40 is a combination system where the output of an STR is pumped into the front end of an extruder. Such a combination system can take a partially converted reaction mixture exiting an STR and allow for further conversion in an extruder. Because the reaction mixture being fed into the extruder is already fairly viscous, the need for a pressurized feed (discussed previously with respect to extruders) is eliminated.

For Zeigler Natta and free radical polymerizations, catalyst or initiator levels used in an STR typically are lower than those used in an extruder because of the lower conversion levels generally achieved in STRs. Therefore, additional catalyst or initiator system components preferably are added to the reaction mixture prior to its transfer to the extruder from the STR. This allows for very high conversions.

A static mixer can also be used as reactor 40. Static mixers comprise a tube, similar to that used in an STR, with a series of twisted stationary blades mounted at various angles throughout the length of the tube. Each section of blades splits and rotates the reaction mixture passing by it.

STRs, extruders, combinations of STRs and extruders, and static mixers have been mentioned as examples of useful designs for reactor 40. They are meant to be merely illustrative. Other designs that allow for essentially plug flow are within the scope of the present invention when used as reactor 40.

D. Quench

A quench solution may be added to the reaction mixture at, or soon after the exit, of reactor 40. This can be accomplished by blending the reaction mixture and quench feeds (not shown) through a simple T-pipe arrangement. To ensure thorough mixing of the two feeds, the combined feed can be fed into another mixer (e.g., a static mixer).

In an extruder polymerization process, a quench solution or compound (if used) is added near the end of the screw(s), preferably just before the vacuum port if one is used. Traditional quenching agents can be used. These include water, alcohols, ketones, amines, etc. However, certain materials that traditionally have been used as stabilizers (e.g., hindered phenols) have been found to be efficient quench materials as well. In addition to being able to deactivate catalyst sites, the quench material preferably is soluble in the reaction mixture (due to the fact that the catalyst sites are in the reaction mixture).

Those skilled in the art are aware of the wide variety of materials that can be used to quench various initiator systems. Commonly used examples include oxygen, water, steam, alcohols, ketones, esters, amines, hindered phenols, etc.

E. Thermal Stabilizer

When a polymer and/or the reaction mixture is to be processed at elevated temperatures (e.g., high temperature devolatilization of the reaction mixture or hot-melt coating of the polymer), addition of a thermal stabilizer to the reaction mixture is preferred. A variety of thermal stabilizers, including hindered phenols and phosphites, are widely used in the industry.

F. Material Isolation and Collection

Individual samples may be collected and catalogued as they exit the PFR. Volatile materials are typically removed by small rotary evaporators, wiped film evaporators or are precipitated in non-solvents, depending upon the class of materials. Polymeric materials are typically dried at elevated temperatures of 80 -150° C. prior to analysis. Small molecule materials may be isolated from mixtures by distillation, column chromatography, precipitation, extraction, and sublimation.

Objects and advantages of this invention are further illustrated by the following examples. The particular materials and amounts thereof, as well as other conditions and details, recited in these examples should not be used to unduly limit this invention.

EXAMPLES

Test Methods

Molecular Weight and Polydispersity

The average molecular weight and polydispersity of a sample was determined by Gel Permeation Chromatography (GPC) analysis. Approximately 25 mg of a sample was dissolved in 10 milliliters (mL) of tetrahydrofuran (THF) to form a mixture. The mixture was filtered using a 0.2 micron polytetrafluoroethylene (PTFE) syringe filter. Then about 150 microliters (µL) of the filtered solution was injected into a Plgel-Mixed B column (available from Polymer Labs, Amherst, Mass.) that was part of a GPC system also having a Waters 717 Autosampler and a Waters 590 Pump. The system operated at room temperature, with a THF eluent that moved at a flow rate of approximately 0.95mL/min. An Erma ERC-7525A Refractive Index Detector was used to detect changes in concentration. Number average molecular weight ($M_n$) and polydispersity index (PDI) calculations were based on a calibration mode that used narrow polydispersity polystyrene controls ranging in molecular weight from $6 \times 10^6$ to $600 \times 10^6$. The actual calculations were made with Caliber software available from Polymer Labs.

Triple Detection Methods

Triple Detection Methods for molecular weight analysis of highly branched materials employ (1) Size Exclusion Chromatography coupled with Light Scattering, (2) Viscometer, and (3) Refractive Index detection using a Waters Alliance 2690 Separations Module, available from Waters Associates, a division of Millipore, Milford, Mass., equipped with column Set consisting of one PLgel Mixed-B 10 micron (60 cm) and one PLgel 500 A (30 cm). The detectors were Viscotek Right Angle Laser Light Scattering (RALLS) and Viscotek Model 250 Viscometer Model 250 Viscometer and Refractometer. The solvent of the system (mobile phase) was THF at a flow rate of 1.0 ml/min at 30 C (set via use of a Eppendorf CH-460 column heater).

Calibration Method: The detector constants were calibrated using a single narrow polydispersity Polystyrene Standard (available from American Polymer Standards) of $M_w$=115,000. The Light Scattering, Viscometer and Refractomer constants were calculated for the above known molecular weight and a known Intrinsic Viscosity ($IV_w$) of 0.490 (calculated from Mark Houwink equation: a and K values published in the Polymer Handbook (4$^{th}$ ed. J. Wiley, New York, 1999). The calibration constants were cross-checked for a broad Polystyrene standard of $M_w$=250,000 and $M_n$=100,000. The dn/dc value for the polystyrene standard was 0.185 (Polystyrene in THF from Polymer Handbook). Approximately 25 mg of a sample was dissolved in 10 milliliters (mL) of tetrahydrofuran (THF) to form a mixture. The mixture was filtered using a 0.2 micron polytetrafluoroethylene (PTFE) syringe filter.

Block Concentration

The concentration of different blocks in a block copolymer was determined by Nuclear Magnetic Resonance (NMR) spectroscopy analysis. A sample was dissolved in deuterated chloroform to a concentration of about 10 wt % and placed in a Unity 500 MHz NMR Spectrometer available from Varian, Palo Alto, Calif. Block concentrations were calculated from relative areas of characteristic block component spectra.

Inherent Viscosity (I.V.) measurements were summed and divided by the number of data points to give a mean I.V. The standard deviation (SD) of the data points was calculated using the formula $$SD = [\Sigma(X_i - X_a)^2/(n-1)]^{1/2}$$

where $X_i$ is an individual I.V. measurement, $X_a$ is the mean I.V., and n is the number of data points. Because SD is underestimated by this formula when n is less than 20, a confidence limit (CL) for those examples with fewer than 20 data points was calculated using the formula $$CL = X_a \pm (t_{60})[(SD)/(n)^{1/2}]$$

where $X_a$, SD, and n are defined as above; (1−2α) is the probability that the true mean will be within the calculated confidence limits; and $t_{60}$ is the value of the Student's t distribution for the desired probability. This equation is well known to those skilled in the art of statistical analysis. See G. E. P. Fox, W. Hunter, J. S. Hunter, Statistics for Experiments, John Wiley-Interscience 1978.

| Material | Description |
| --- | --- |
| Octene | Available from BP Amoco Corporation, Chicago, Ill. |
| Propylene | Available from Oxygen Services Inc., Minneapolis MN |
| $TiCl_4$ supported on $MgCl_2$ powder | Available from Engelhard Corporation, Pasadena, Texas, under the trade name LYNX 715 |
| Triethylaluminum | Available as a 25 wt. % solution of triethyl aluminum in heptane from Albemarle Corporation, Houston, Texas |
| 2-Ethylhexyl acrylate | Available from BASF Corporation, Chemicals Division, Mt. Olive, NJ. |
| Acrylic acid | Available from BASF Corporation, Chemicals Division, Mt. Olive, NJ. |
| Butyl acrylate | Available from Aldrich Chemical Co., Milwaukee, Wisconsin. |
| Tert dodecyl mercaptan | Available from Aldrich Chemical Co., Milwaukee, Wisconsin |
| 2,2'-Azodi(2,4dimethyl-valeronitrile) | Available from Dupont Specialty Chemicals, Wilmington, Delaware under the trade name VASO 52. |
| Hexanediol dimethacrylate | Available from Sartomer, Exton, Pennsylvania |
| Isoprene | Available from Aldrich Chemical Co., Milwaukee, Wisconsin. |
| Styrene | Available from Ashland Chemical, Columbus, Ohio. |
| 4-Vinyl pyridine | Available from Reilly Industries, Indianapolis, Indiana. |
| t-Butyl methacrylate | Available from Sans Esters Corp., New York, New York. |
| Isodecyl methacrylate | Available from Ciba Specialty Chemicals Corp., Water Treatments Div., Suffolk, Virginia. |
| Glycidyl methacrylate | Available from Sartomer, Exton, Pennsylvania. |
| Diphenylethylene | Available from Acros/Fisher Scientific, Itasca, Illinois. |
| Divinylbenzene | Available from Aldrich Chemical Co. |
| sec-Butyl lithium | An anionic initiator, 1.3 Molar in cyclohexane, available from Aldrich Chemical Co. |
| Toluene | Available from Worum Chemical, St. Paul, Minnesota. |

-continued

| Material | Description |
|---|---|
| Tetrahydrofuran (THF) | Available from ISP Technologies, Wayne, New York. |
| Octadecyl 3,5-di-tert-butyl-4 hydroxyhydrocinnamate | Available from Ciba Specialty Chemicals Corp. Tarrytown, New York under the trade name IRGANOX 1076. |

Monomer Preparation and Handling

Anionic Chemistries: Examples 1-7

The reactant monomers in the examples (isoprene, styrene, vinyl pyridine, t-butyl methacrylate, isodecyl methacrylate, glycidyl methacrylate, diphenylethylene and divinylbenzene) were nitrogen sparged until the $O_2$ concentration was less than 1 part per million (ppm). Deoxygenated monomer was pumped through a column (l=50 cm, d=2 cm) of basic alumina ($Al_2O_3$, Aldrich, Brockmann I, about 150 mesh,). The purified monomer was then fed directly to the first zone of a stirred tubular reactor (STR) when used for the initial block, or at a later zone of the STR for a subsequent block formation. Reaction solvents (either toluene, cyclohexane or a mixture) were pumped through molecular sieve beads (available as Zeolite 3A from UOP, Chickasaw, Ala.) and fed directly to the STR. In isoprene-based examples where a THF co-solvent was used, the THF also was deoxygenated by nitrogen sparging for 30 minutes and purified by pumping through both 3A molecular sieve beads (available as Zeolite 3A, UOP) and a column of alumina (available as $Al_2O_3$, Aldrich, Brockmann I, 150 mesh,). The THF stream was then fed directly to the first or second zone of the PFR. For examples 1-6, a sec-butyl lithium initiator (1.3 Molar (M) sec-butyl lithium in cyclohexane) was diluted by addition of pre-purified toluene. For example 7, 1,1 diphenyl hexyl lithium was used 7 of sec-butyl lithium. For each example, the initiators were added to the first zone of the STR.

Free Radical Chemistry: Example 8

The monomers and initiator were sparged with nitrogen for 30 minutes prior to reaction.

Ziegler Natta Chemistry: Example 9

The monomers and catalyst were nitrogen sparged until the oxygen concentration was less than 1 ppm. Deoxygenated monomer was pumped through a molecular sieve column containing 3A molecular sieve beads until water concentration was less than 1 ppm. The purified monomer was then fed to a feed tank. Purified monomer was pressure fed from the feed tank to the PFR through a 33 cm long (5.1 cm inside diameter) column containing activated alumina (Fisher Scientific; Pittsburgh, Pa.) and Grade 408 silica gel activated desiccant (Davidson Chemicals; Baltimore, Md.) in a ratio of 25:75.

STR Descriptions

10 L STR—This STR had a capacity of 10 L and consisted of five approximately equal Pyrex cylinders, each with an outside diameter of 7.62 cm, an inside diameter of 6.99 cm, and a length of 57.2 cm. These were joined together with bored, grooved stainless steel disks. The STR was closed off at both ends with stainless steel disks, and the cylindrical sections were enclosed with jackets made of glass, available as Pyrex glass, (available from Coming Glass Works; Corning, N.Y.). The jackets were 11.5 cm outside diameter, 52.1 cm long, and equipped with individual temperature sensing devices extending into the interior of the cylindrical sections. These temperature sensing devices permitted the temperature of the reaction mixture in each section to be monitored and adjusted up or down (as necessary) to a set point by varying the temperature of the heat transfer fluid flowing through the jacketed sections.

Extending through the center of the joined cylinders was a 1.27 cm diameter stainless steel shaft suspended along the cylinder axis by shaft alignment pins. To the shaft were affixed 43 detachable stainless steel paddles with approximately 3.2 cm between each paddle. Two different types of paddles were used in the STR. The paddles consisted of (1) cylinders with a 1.27 cm hole cut through the center of the cylinder perpendicular to the cylinder axis and (2) rectangles with the long end perpendicular to the shaft axis and bent so that the center of the rectangle was wrapped half way around the shaft. The cylindrical paddles were 1.9 cm in diameter and 2.5 cm long thus providing a clearance from the inner wall of the glass cylinder of approximately 1.0 cm. The rectangular paddles were 1.9 mm thick and 4.1 cm wide and 4.8 cm long in reactor sections 1 and 2 (with a resulting clearance of 1.4 cm) or 5.1 cm wide and 5.7 cm long in reactor sections 3, 4, and 5 (with a resulting clearance of 0.6 cm). Rectangular paddles with a length of 5.7 cm and width varying between 1.3 cm and 2.5 cm were used near the bored end caps to avoid collision with the end flanges. The paddle configuration used was as follows: in section 1, six cylindrical paddles followed by four rectangular paddles; in section 2, eight rectangular paddles; in section 3, nine rectangular paddles; in section 4, eight rectangular paddles; and in section 5, eight rectangular paddles.

4L STR—This STR had a capacity of 4 L and consisted of one 316 stainless steel inlet section (21.59 cm long by 5.48 cm in diameter) and four additional stainless steel sections (316 SS), each with an outside diameter of 6.03 cm, an inside diameter of 5.48 cm, and alternating lengths of 67.31 cm and 38.58 cm. These were joined together with stainless steel clamps. The STR was closed off at both ends with stainless steel disks, and the cylindrical sections were enclosed with jackets made of stainless steel. The jackets were equipped with individual temperature sensing devices extending into the interior of the cylindrical sections. These temperature sensing devices permitted the temperature of the reaction mixture in each section to be monitored and adjusted up or down (as necessary) to a set point by varying the temperature of the heat transfer fluid flowing through the jacketed sections.

Extending through the center of the joined cylinders was a 0.95 cm diameter stainless steel shaft suspended along the cylinder axis by shaft alignment pins. To the shaft were affixed 59 detachable stainless steel paddles with approximately 1.9 cm between each paddle. The rectangular paddles were 3.2 mm thick and 1.91 cm wide and 3.81 cm long in the reactor sections. The paddle configurations used was as follows: in the inlet section, five rectangular paddles; in section 1, ten rectangular paddles; in section 2, seventeen rectangular paddles; in section 3, ten rectangular paddles; and in section 4, seventeen rectangular paddles.

2 L Stainless Steel STR—This STR had a capacity of 2 L and consisted of four approximately equal cylinders, each with an outside diameter of 6.03 cm, an inside diameter of 4.92 cm, and length of 45.97 cm. The construction of the STR was one piece in nature with welded coupling sections between cylinders. The STR was closed off at both ends with stainless steel disks, and the cylindrical sections were enclosed with stainless steel jackets. The jackets were equipped with individual temperature sensing devices extending into the interior of the cylindrical sections. These temperature sensing devices permitted the temperature of the reaction mixture in each section to be monitored and adjusted up or down (as necessary) to a set point by varying the temperature of the heat transfer fluid flowing through the jacketed sections.

Extending through the center of the joined cylinders was a 0.95 cm diameter stainless steel shaft suspended along the cylinder axis by shaft alignment pins. To the shaft were affixed 50 detachable stainless steel paddles with approximately 1.9 cm between each paddle. The rectangular paddles were 3.2 mm thick and 1.91 cm wide and 3.81 cm long in the reactor sections. The paddle configurations used were as follows: in section 1, thirteen rectangular paddles; in section 2, twelve rectangular paddles; in section 3, twelve rectangular paddles; and in section 4, thirteen rectangular paddles.

2L Glass STR—The STR had a capacity of 2 L and consisted of four glass sections (Pyrex cylinders), each with an outside diameter of 5.08 cm, an inside diameter of 4.45 cm, and a alternating lengths of 30.48 cm and 60.96 cm. These were joined together with stainless steel clamps. The STR was closed off at both ends with stainless steel disks, and the cylindrical sections were enclosed with jackets made of PYREX. The jackets were equipped with individual temperature sensing devices extending into the interior of the cylindrical sections. These temperature sensing devices permitted the temperature of the reaction mixture in each section to be monitored and adjusted up or down (as necessary) to a set point by varying the temperature of the heat transfer fluid flowing through the jacketed sections.

Extending through the center of the joined cylinders was a 0.95 cm diameter stainless steel shaft suspended along the cylinder axis by shaft alignment pins. To the shaft were affixed 52 detachable stainless steel paddles with approximately 1.9 cm between each paddle. The rectangular paddles were 3.2 mm thick and 1.91 cm wide and 3.81 cm long in the reactor sections. The paddle configurations used was as follows; in section 1, nine rectangular paddles; in section 2 seventeen rectangular paddles; in section 3, nine rectangular paddles; and in section 4, seventeen rectangular paddles.

The shaft was attached to a 2.2 kW variable speed motor and driven at approximately 150 rpm. The direction of the shaft reversed about every minute.

Extruder Description

The extruder used was a modular (16 section) intermeshing, counter rotating, twin-screw model (Leistritz AG; Nuremberg, Germany) fitted with a $N_2$-purged shroud.

Intermeshing screw elements on the two shafts were configured with fast pitch elements at the beginning of the shafts which tapered to slow pitch elements thereafter. In cases where addition of adjuvants (such as a quenching solution, antioxidants, and the like) was desirable, the screw configuration at the addition point used faster pitch elements to permit volume additions. In cases where it was desirable to remove monomers or other volatile components from the reaction product, the screw configuration at the removal point used triple start screw elements to reduce the reaction mixture volume in the slots of the screws so the reaction mixture would not plug the vacuum ports placed over the triple start screw elements to move the volatile components.

The diameter of the screw was 50 mm with a length-to-diameter ratio of 60. The screws were made from a high alloy, chrome-hardened steel and fitted into water-cooled barrels made from a high alloy, nitride-treated steel.

Example 1

Poly(isoprene-4-vinyl pyridine) Block Copolymer—10 L STR

This example illustrates that the composition of constituent blocks in a block copolymer, made from anionically polymerizable monomers can be varied with time in the continuous process. This concept can be used to generate large material libraries.

An initiator slurry was prepared by mixing 1267 ml of 1.3 M sec-butyl lithium in cyclohexane with 4094 g of oxygen-free toluene and stirred at room temperature for about 30 minutes. Purified isoprene monomer (pressure fed at a rate of 85.8 g/min), purified THF (pressure fed at a rate of 23 g/min) and purified toluene solvent (diaphragm-pumped at a rate of 123.8 g/min) were fed into zone 1 of the STR. The initiator slurry was introduced by peristaltic pump at a rate of 12.5 ml/min into zone 1 of the STR. A color change from clear to yellow was observed in zone 1 when the initiator solution contacted the monomer, and an exotherm resulted. The reaction temperature was kept at about 53° C. by adjusting the jacket temperature of zone 1 to 20° C. The temperature of the reaction mixture in each of the 5 zones of the STR was individually maintained at: #1=53° C., #2=40° C., #3=40° C., #4=40° C., and #5=50° C.

The materials flowed through the first four zones, facilitated by stirring paddles along the reaction path. Polymerization continued to essentially 100% completion by the end of zone 4, thereby forming a "living" polyisoprene polymer mixture. At the start of zone 5, purified vinyl pyridine (VP) was pressure fed (at various flow rates, see table) to the "living" polyisoprene reactive mixture, resulting in another color change, from yellow to burgandy-brown, indicating that a poly(isoprene-4-vinyl pyridine) block copolymer had formed. The initial reaction mixture in zone 1 contained 37 wt % isoprene monomer. The resulting viscous solution flowed from the reactor and was collected in individual silicone lined containers. The total residence time for these reactions was 37.5 minutes. At various points in the polymerization run, the vinyl pyridine flow rate was varied and samples collected for analysis Each sample was tested for number average molecular weight (Mn), polydispersity index (PDI) and relative concentration of 1,4 polyisoprene to 1,2 polyisoprene to 3,4 polyisoprene to vinyl pyridine. Results are shown in Table 1. Fluctuations in isoprene microstructure are due to slight changes in THF concentration over time.

TABLE 1

Analytical Results for PI-PVP Block copolymers

| Ex. | Time Of Day (Hr:min) | VP Flow-rate (g/min) | 1,4 PI (mole %) | 1,2 PI (mole %) | 3,4 PI (mole %) | VP (mole %) | Mn ($\times 10^4$) | PDI |
|---|---|---|---|---|---|---|---|---|
| 1A | 9:50 | 6 | 38.3 | 4.3 | 50.7 | 6.7 | 2.04 | 2.69 |
| 1B | 10:40 | 6 | 47.9 | 4.1 | 41.7 | 6.4 | 1.78 | 2.65 |
| 1C | 12:05 | 3 | 52.8 | 2.5 | 41.4 | 3.3 | 1.92 | 2.51 |
| 1D | 12:47 | 6 | 50.3 | 2.6 | 39.4 | 7.7 | 1.87 | 2.49 |
| 1E | 2:25 | 20 | 45.4 | 2.9 | 39.1 | 12.7 | 1.61 | 2.61 |

TABLE 1-continued

Analytical Results for PI-PVP Block copolymers

| Ex. | Time Of Day (Hr:min) | VP Flow-rate (g/min) | 1,4 PI (mole %) | 1,2 PI (mole %) | 3,4 PI (mole %) | VP (mole %) | Mn (×10⁴) | PDI |
|---|---|---|---|---|---|---|---|---|
| 1F | 2:40 | 20 | 46.0 | 3.1 | 38.1 | 12.7 | 1.59 | 2.59 |
| 1G | 3:30 | 25 | 40.3 | 2.9 | 35.3 | 19.3 | 1.58 | 2.54 |

Example 2

Poly(styrene-4-vinyl pyridine) Block Copolymer—2L Glass STR

This experiment exemplifies that this invention can be extended to different size STRs. An initiator slurry was prepared by mixing 585 ml of 1.3 M sec-butyl lithium solution in 6049 g of $O_2$-free toluene and continuously stirring at room temperature for about 30 minutes. The stirring was done under nitrogen to prevent stratification and oxygen contamination. Purified styrene monomer (pressure fed at a rate of 31.7 g/min) and purified toluene solvent (diaphragm-pumped at a rate of 154.9 g/min) were passed into zone 1 of the STR. The initiator slurry was introduced by peristaltic pump at a rate of 19.6 ml/min into zone 1 of the STR. The solids loading of this reaction was 44 wt % in styrene monomer. A color change, from clear to red-orange, was observed in zone 1 when the initiator solution contacted the monomer, and an exotherm resulted. The mixture temperature in zone 1 was kept at about 43° C. by adjusting the jacket temperature of zone 1 to 30° C. The temperature of the mixture in each of the 4 zones of the STR was individually maintained at: #1=43° C., #2=30°C., #3=30°C., #4=30°C., as measured at the end of each reactor section, by adjusting the jacket temperatures as needed.

The materials flowed through the first three zones facilitated by the stirring paddles along the reaction path. Polymerization continued to 100% completion by the end of zone 3, thereby forming a "living" polystyrene reaction mixture. At the start of zone 3, purified vinyl pyridine was pressure fed (at a various rates, see table 2) into the "living" polystyrene reaction mixture, resulting in another color change, from red-orange to burgandy red. The color change indicated that a poly(styrene-4-vinyl pyridine) block copolymer had formed The combined residence time for these reactions in the STR was 26.5 minutes.

Each sample was tested for number average molecular weight (Mn), polydispersity index (PDI) and relative block concentration of styrene to vinyl pyridine. Results are shown in Table 2.

TABLE 2

Analytical Results for PS-PVP Block copolymers

| Example | Time of Day (HR:min) | VP Flowrate (g/min) | Styrene (mole %) | VP (mole %) | Mn (×10⁴) | PDI |
|---|---|---|---|---|---|---|
| 2A | 11:20 | 0 | 100 | 0 | 1.29 | 2.35 |
| 2B | 11:35 | 1.5 | 96.9 | 3.1 | 1.15 | 2.67 |
| 2C | 11:45 | 6 | 92.5 | 7.5 | 1.21 | 2.62 |
| 2D | 11:52 | 6 | 92.2 | 7.8 | 1.87 | 2.74 |
| 2E | 12:00 | 3 | 94.2 | 5.8 | 1.37 | 2.65 |
| 2F | 12:05 | 3 | 94.2 | 5.8 | 1.59 | 2.70 |
| 2G | 12:25 | 1.5 | 99.0 | 1.0 | 1.58 | 2.51 |
| 2H | 12:35 | 1.5 | 98.4 | 1.6 | 1.31 | 2.54 |

TABLE 2-continued

Analytical Results for PS-PVP Block copolymers

| Example | Time of Day (HR:min) | VP Flowrate (g/min) | Styrene (mole %) | VP (mole %) | Mn (×10⁴) | PDI |
|---|---|---|---|---|---|---|
| 2I | 12:40 | 1.5 | 97.3 | 2.7 | 1.31 | 2.62 |
| 2J | 1:15 | 1.5 | 94.7 | 5.3 | 1.25 | 2.55 |
| 2K | 1:25 | 3 | 97.0 | 3.0 | 1.41 | 2.70 |
| 2L | 1:55 | 4.5 | 88.5 | 11.5 | 1.23 | 2.87 |
| 2M | 2:00 | 4.5 | 88.9 | 11.1 | 1.23 | 2.83 |

Example 3

Poly(styrene-4-vinyl pyridine) Block Copolymer—2L Glass STR

This experiment exemplifies that by not allowing the reactor to achieve steady state after a process change unexpected midpoints between anticipated or selected library members can be obtained.

An initiator slurry was prepared by mixing 585 ml of 1.3 M sec-butyl lithium solution in 6049 g of $O_2$-free toluene and continuously stirring at room temperature for about 30 minutes. The stirring was done under nitrogen to prevent stratification and oxygen contamination. Purified styrene monomer (fed by a reciprocating piston-pump at a rate of 31.7 g/min) and purified toluene solvent (fed by a reciprocating piston-pump at a rate of 154.9 g/min) were passed into zone 1 of the STR. The initiator slurry was introduced by peristaltic pump at a rate of 19.6 ml/min into zone 1 of the STR. The solids loading of this reaction was 44 wt % in styrene monomer. A color change, from clear to red-orange, was observed in zone 1 when the initiator solution contacted the monomer and an exotherm resulted. The mixture in zone 1 was controlled by adjusting the jacket temperature of zone 1 to 30° C. The temperature of the mixture in each of the 4 sections of the STR was individually maintained at: #1=43° C., #2 30°C., #3=30°C., #4=30°C., as measured at the end of each reactor zone, by adjusting the jacket temperatures as needed.

The materials flowed through the first three zones facilitated by the stirring paddles along the reaction path. Polymerization continued to 100% completion by the end of zone 3, thereby forming a "living" polystyrene reaction mixture. At the start of zone 3, purified vinyl pyridine was pressure fed (at a various rates, see table 3) into the "living" polystyrene reaction mixture, resulting in another color change, from red-orange to burgandy red. The color change indicated that a poly(styrene-4-vinyl pyridine) block copolymer had formed. The combined residence time for these reactions in the STR was 26.5 minutes.

Each sample was tested for number average molecular weight (Mn), polydispersity index (PDI) and relative block concentration of styrene to vinyl pyridine. Results are shown in Table 3.

TABLE 3

Analytical Results for PS-PVP Block copolymers

| Example | Flow Rate (g/min) | Duration of Time at Flow Rate (min) | Styrene (mole %) | VP (mole %) | $M_n$ ($\times 10^4$) | PDI |
|---|---|---|---|---|---|---|
| 3A1 | 2.0 | 15 | 93.1 | 6.9 | 3.53 | 2.65 |
| 3A2 | 2.0 | 20 | 96.6 | 3.4 | 3.48 | 2.53 |
| 3A3 | 2.0 | 25 | 96.0 | 4.0 | 3.46 | 2.51 |
| 3B1 | 2.3 | 0 | 94.8 | 5.2 | 3.26 | 2.34 |
| 3B2 | 2.3 | 5 | 93.7 | 6.3 | 2.81 | 2.51 |
| 3B3 | 2.3 | 10 | 93.2 | 6.8 | 2.66 | 2.58 |
| 3C1 | 2.5 | 10 | 93.5 | 6.5 | 3.63 | 2.40 |
| 3C2 | 2.5 | 15 | 93.0 | 7.0 | 3.30 | 2.49 |
| 3C3 | 2.5 | 20 | 94.1 | 5.9 | 3.46 | 2.44 |
| 3C4 | 2.5 | 25 | 93.2 | 6.8 | 3.50 | 2.51 |
| 2D1 | 2.6 | 0 | 95.8 | 4.2 | 2.76 | 2.65 |
| 3D2 | 2.6 | 5 | 94.1 | 5.9 | 2.62 | 2.64 |
| 3D3 | 2.6 | 10 | 93.5 | 6.5 | 2.72 | 2.51 |
| 3D4 | 2.6 | 15 | 93.4 | 6.6 | 2.56 | 2.65 |
| 3E1 | 3.0 | 5 | 93.5 | 6.5 | 2.48 | 2.69 |
| 3E2 | 3.0 | 10 | 93.3 | 6.7 | 3.30 | 2.60 |
| 3E3 | 3.0 | 14 | 92.7 | 7.3 | 2.81 | 2.40 |
| 3E4 | 3.0 | 20 | 92.9 | 7.1 | 3.47 | 2.45 |
| 3E5 | 3.0 | 25 | 93.0 | 7.0 | 3.48 | 2.49 |
| 3F1 | 3.3 | 0 | 91.8 | 8.2 | 2.65 | 2.56 |
| 3F2 | 3.3 | 5 | 92.1 | 7.9 | 2.71 | 2.55 |
| 3F3 | 3.3 | 10 | 92.1 | 7.9 | 2.87 | 2.50 |
| 3F4 | 3.3 | 15 | 91.8 | 8.2 | 2.71 | 2.56 |
| 3G1 | 3.5 | 10 | 91.7 | 8.3 | 3.98 | 2.57 |
| 3G2 | 3.5 | 15 | 91.5 | 8.5 | 3.89 | 2.60 |
| 3G3 | 3.5 | 20 | 90.7 | 9.3 | 3.61 | 2.74 |
| 3G4 | 3.5 | 25 | 90.9 | 9.1 | 3.82 | 2.56 |
| 3H1 | 3.6 | 0 | 92.3 | 7.7 | 2.96 | 2.40 |
| 3H2 | 3.6 | 5 | 91.7 | 8.3 | 2.81 | 2.55 |
| 3H3 | 3.6 | 10 | 91.4 | 8.6 | 3.02 | 2.44 |
| 3H5 | 3.6 | 15 | 91.5 | 8.5 | 3.06 | 2.39 |
| 3I1 | 3.9 | 0 | 90.9 | 9.1 | 3.44 | 2.18 |
| 3I2 | 3.9 | 5 | 91.0 | 9.0 | 3.48 | 2.13 |
| 3I3 | 3.9 | 15 | 91.0 | 9.0 | 3.00 | 2.54 |
| 3J1 | 4.0 | 10 | 90.8 | 9.2 | 4.03 | 2.38 |
| 3J2 | 4.0 | 15 | 90.3 | 9.7 | 3.90 | 2.44 |
| 3J3 | 4.0 | 20 | 91.5 | 8.5 | 3.87 | 2.42 |
| 3J4 | 4.0 | 25 | 89.9 | 10.1 | 4.07 | 2.31 |
| 3K1 | 4.2 | 0 | 90.3 | 9.7 | 3.37 | 2.28 |
| 3K2 | 4.2 | 5 | 90.9 | 9.1 | 3.47 | 2.26 |
| 3K3 | 4.2 | 10 | 90.2 | 9.8 | 3.56 | 2.21 |
| 3L1 | 4.5 | 0 | 90.2 | 9.8 | 3.52 | 2.27 |
| 3L2 | 4.5 | 5 | 88.8 | 11.2 | 3.86 | 2.16 |
| 3L3 | 4.5 | 10 | 89.8 | 10.2 | 4.07 | 2.18 |
| 3L4 | 4.5 | 15 | 89.2 | 10.8 | 4.07 | 2.26 |

Example 4

Poly(styrene-alkyl methacrylate) Block Copolymers

Synthesis of Poly(styrene-isodecyl methacrylate), Poly(styrene-t-butyl methacrylate), and Poly(styrene-glycidyl methacrylate)—10 L STR This experiment exemplifies the ability to change the identity of a particular segment in a block copolymer composition in a continuous fashion. This involves switching monomer types without shutting down the entire continuous process.

An initiator slurry was prepared by mixing 1785 ml of 1.3 M sec-butyl lithium solution with 4918 g of dry, oxygen-free toluene and stirring at room temperature for about 30 minutes. Purified styrene monomer (pressure fed at a rate of 96.7 g/min), and purified toluene solvent (pumped at a rate of 137.5 g/min) fed into the first zone of the STR. The initiator slurry was introduced by peristaltic pump (at a rate of 14.6 g/min) into the first zone of the STR. A color change from clear to orange-red was observed in zone 1 when the initiator solution contacted the monomer, and an exotherm resulted.

The materials in the first zone were kept at a constant temperature of about 65° C. by adjusting the jacket temperature of zone 1 to 34° C. The temperature of the reaction mixture in each of the 5 zones of the STR was individually maintained at: #1=65° C., #2=40° C., #3=20° C., #4=20° C., and #5=15° C.

The materials flowed through the first two zones facilitated by stirring paddles along the reaction path. This polymerization continued to substantially 100% completion by the end of zone 2, thereby forming "living" polystyrene reaction mixture. At the start of zone 3 zone 3 purified diphenylethylene as a 5 wt% solution in toluene was added by a reciprocating piston pump (at a rate of 20.0 g/min) to the "living" polystyrene reaction mixture, resulting in a diphenylethylene-modified polystyryl chain. This chain was treated at the start of zone 4 with purified alkyl methacrylates (pressure fed at various rates) to form poly(styrene-alkyl methacrylate) block copolymers (alkyl=isodecyl, t-butyl, glycidyl). The first methacrylate used was isodecyl methacrylate (IDMA) (pressure fed at 45 g/min) After a period of time the IDMA flow was stopped without disrupting the initial flow of butyl lithium, styrene, and toluene. This allowed formation of polystyrene homopolymer that separated copolymer samples. After 7.5 minutes, a t-butyl methacrylate (TBMA) stream was initiated (pressure fed at 30 g/min, solids content 39 %). This procedure was repeated for the glycidyl methacrylate stream (GMA). The residence time for these reactions was 37.5 minutes. Samples were taken from the reactor at appropriate intervals and placed in silicone lined cardboard boxes for vacuum drying.

Volatile components were removed by vacuum drying these materials in an oven at 100° C. for 24 hours, and the sample was tested for number average molecular weight (Mn), polydispersity index (PDI) and relative block concentration of styrene to alkyl methacrylate. Results are shown in Table 4.

TABLE 4

Analytical results for poly(styrene-alkyl methacrylate) block copolymer materials

| Example | Material | Mn ($\times 10^4$) | PDI | Segments (components:mole % ratio) |
|---|---|---|---|---|
| 4A | IDMA | 2.56 | 2.81 | Styrene/IDMA:83/17 |
| 4B | TBMA | 2.59 | 2.43 | Styrene/TBMA:80.3/19.7 |
| 4C | GMA | 2.13 | 2.36 | Styrene/GMA:8.4/1.6 |

Example 5

Starbranched/Hyperbranched Poly(styrene)—10 L STR

This example shows the versatility of the continuous method by showing that the material classes accessible by this method include starbranched materials. Divinylbenzene (DVB) (as a 2 wt % solution in toluene) flow rates were varied over time, increasing from 6-30 g/min over time to examine the effect of DVB concentration on styrene branching (Table 5).

An initiator slurry was prepared by mixing 995 ml of 1.3 M sec-butyl lithium solution with 4665 g of dry, oxygen-free toluene and stirred at room temperature for about 30 minutes. A 2 wt % solution divinylbenzene in purified toluene solvent was prepared by mixing 281 g of the difunctional monomer (DVB) in 1126 g of oxygen-free toluene under a nitrogen atmosphere. Purified styrene monomer (pressure fed at a rate of 78.2 g/min), and purified toluene solvent (pumped at a rate of 155.1 g/min) were fed into the first zone of the STR. The initiator slurry was introduced by peristaltic pump (at a rate of 75 g/min) into zone 1 of the STR. The solids loading of this reaction was 22 wt % in styrene monomer. A color change, from clear to orange red, was observed in zone 1 when the initiator solution contacted the monomer and an exotherm resulted. The materials in the first zone were kept at a constant temperature of about 58° C. by adjusting the jacket temperature of zone 1 to 30 C. The temperature of the reaction mixture in each of the 5 zones of the STR was individually maintained at: #1=58° C., #2=58° C., #3=63° C., #4=56° C., and #5=50° C. The materials flowed through the first four zones facilitated by stirring paddles along the reaction path. This polymerization continued to substantially 100 % completion by the end of zone 4, thereby forming a "living" polystyrene polymer. A purified divinylbenzene (DVB) stream, as a 2 wt % solution in toluene, was added (pressure fed at various rates, see table 5A) at the start of Zone 5, resulting in a starbranched polystyryl chain as evidenced by the appearance of a burgundy colored solution, indicative of branching due to divinylbenzene. The total residence time for these reactions was 37.5 minutes. The material was collected after zone 5 in 5 gallon pails and quenched by addition of isopropanol. For each sample, volatile components were removed by vacuum drying these materials in an oven at 100C. for 24 hours. Samples were taken at 15 minutes after each flow rate adjustment.

Each sample was tested for number average molecular weight (Mn) and Polydispersity Index (PDI). Results are shown in Tables 5A and 5B. $IV_w$ refers to Inherent Viscosity. M-H refers to Mark Houwink equation of the Triple Detection Method.

conformation. The corresponding M-H constant for a linear polystyrene chain is 0.7, indicative of a random coil.

Example 6

Poly(styrene-isoprene-4-vinyl pyridine) ABC Triblock Copolymers—10 L STR

To further emphasize the utility of this method, the STR was used to synthesize an ABC-type triblock copolymer by sequential monomer additions. This example displays the ability of this invention to vary more than one component. The styrene and vinyl pyridine flow rates were varied at appropriate intervals to adjust the styrene and vinyl pyridine content of the resultant triblock material.

An initiator slurry was prepared by mixing 607 ml of 1.3 M sec-butyl lithium solution with 6028 g of dry, oxygen-free toluene and continuous stirring at room temperature for about 30 minutes. The stirring was done under nitrogen to prevent stratification and oxygen contamination. Purified styrene monomer (pressure fed at a rate of 20.0 g/min and then later 30 g/min), and purified toluene solvent (diaphragm pumped at a rate of 153.5 g/min) were fed into the 1st zone of the STR. The initiator slurry was introduced by peristaltic pump (at a rate of 15.7 g/min) into the STR. A color change from clear to orange-red was observed in zone 1 when the initiator solution contacted the monomer and an exothern resulted. The materials in the first zone were kept at a constant temperature of about 65° C. by adjusting the jacket temperature of zone 1 to

TABLE 5A

Analytical data for DVB-PS Starbranched Materials*

| Example | Time of Day (Hr:min) | DVB Flow Rate (g/min) | $M_n$ | $M_w$ | PDI | $IV_w$ in THF (dL/g) | M-H values; (a and Log K) |
|---|---|---|---|---|---|---|---|
| 5A1 | 2:40 | 6 | 35800 | 149,800 | 4.18 | 0.237 | 0.310; −2.195 |
| 5A2 | 3:05 | 18 | 40700 | 288,000 | 7.08 | 0.319 | 0.165; −1.371 |
| 5A3 | 3:30 | 30 | 27700 | 1,012,000 | 36.7 | 0.433 | 0.076; −0.796 |

*Measured by Triple Detection methods

TABLE 5B

Comparison of Linear* vs Starbranched** Polystyrene Viscosity

| Example | Mw | **Starbranched ($IV_w$) in THF | *Linear ($IV_w$) in THF |
|---|---|---|---|
| 5B1 | 150,000 | 0.237 | 0.615 |
| 5B2 | 277,000 | 0.319 | 0.943 |
| 5B3 | 1,010,000 | 0.433 | 2.39 |

*Comparative Data From American Polymer Standards.
**From Experimental Data.

As seen from the triple detection results, comparison of the IV data for the starbranched materials with data for their linear counterparts shows the compact nature of the starbranched polymers. Also, the starbranched materials have M-H constants of less than 0.3, consistent with a spherical 36° C. The temperature of the reaction mixture in each of the 5 sections of the STR was individually maintained at: #1=65° C., #2=59° C., #3=50° C., #4=41° C., and #5=35° C.

The materials flowed through the first zone facilitated by stirring paddles along the reaction path. Polymerization continued to substantially 100% completion by the end of zone 1, thereby forming a "living" polystyrene polymer. At the start of zone 2, isoprene (at a rate of 76.5 g/min) and purified THF (at a rate of 6.5 g/min) were added, resulting in a strong exotherm with a color change from red to yellow indicating the formation of polystyrene-isoprene block copolymers. The materials flowed through zones 2-4 facilitated by the stirring paddles along the reaction path and the polymerization continued to substantially 100% completion. At the start of Zone 5, vinyl pyridine is added (at a rate of 14 and 21 g/min) and the color of the resultant solution turned from yellow to dark burgundy. Solids content for this reaction was about 36 % in total monomers. The total residence time for the three reactions was 50 minutes.

The example was tested for relative block concentration of styrene to isoprene to vinyl pyridine. Results are shown in Table 6.

TABLE 6

Quantitative results of the PS-PI-VP copolymers

| Ex. | Styrene Flowrate (g/min) | Styrene (mole %) | 1,4-PI (mole %) | 1,2-PI (mole %) | 3,4-PI (mole %) | VP (mole %) | VP Flow (g/min) |
|---|---|---|---|---|---|---|---|
| 6A | 20 | 19.6 | 26.1 | 7.8 | 41.8 | 4.7 | 14 |
| 6B | 20 | 20.9 | 22.4 | 6.3 | 38.6 | 11.7 | 21 |
| 6C | 30 | 27.1 | 21.3 | 5.5 | 33.8 | 12.3 | 21 |

Example 7

Poly(isodecyl methacrylate) Starbranched Materials—2L Stainless Steel Reactor This example displays the ability to perform this invention at low temperatures.

A 5 % 1,6-hexanediol dimethacrylate (HDDMA) solution in toluene was prepared by mixing 72 g of prepurified HDDMA with 1368 g of oxygen-free toluene and stirring at room temperature for about 10 minutes.

An initiator slurry was prepared by mixing 712 ml of 1.3 M sec-butyl lithium in cyclohexane with 2949 g of oxygen-free toluene and stirred at room temperature for about 10 minutes. To this solution was added 167 g of 1,1-diphenylethylene, which resulted in the formation of a red colored solution of 1,1-diphenyhexyl lithium. Purified isodecyl methacrylate monomer (pumped via a reciprocating piston pump at a rate of 11.5 g/min), and purified toluene solvent (pumped via an reciprocating piston pump at a rate of 27.8 g/min) were fed into zone 1 of the 2L stainless steel STR through a heat exchanger immersed in a –78° C. bath. The batch temperature profile of the STR zones prior to catalyst addition was as follows: #1=–64° C., #2=–63° C., #3=–63° C., #4=–54° C.

The initiator solution was introduced by peristaltic pump at a rate of 8.0 ml/min into zone 1 of the STR when the initiator solution contacted the monomer an exotherm resulted. The temperature of the reaction mixture in each of the 4 zones of the STR was individually maintained at: #1=–58° C., #2=–63° C., #3=–63° C., #4=–54° C.

The materials flowed through the first four zones facilitated by stirring paddles along the reaction path. Polymerization continued to 100% completion by the end of zone 3, thereby forming a "living" poly(isodecyl methacrylate) polymer solution. At the start of zone 4 a purified 5% solution of HDDMA in toluene (pumped via a reciprocating piston pump at various flow rates, see table) to the "living" poly(isodecyl methacrylate) reactive mixture, resulting in the poly(isodecyl methacrylate) starbranched material. The initial solids loading of this reaction was 25 wt % in isodecyl methacrylate monomer. The resulting viscous solution flowed from the reactor and was collected in individual silicone lined containers. The total residence time for these reactions was 40 minutes. At various points in the polymerization run the isodecyl methacrylate and HDDMA flow rate was varied and samples collected for analysis.

Each sample was tested for number average molecular weight (Mn) and Polydispersity Index (PDI) by Gel permeation Chromatography]. The identity of the polymer and examination of the reaction mixture for residual monomer was conducted by NMR spectroscopy Results are shown in Table 7.

TABLE 7

Quantitative results for poly(isodecyl methacrylate) starbranched material

| Ex. | Time of Day (Hr:min) | $M_n$ (×10³) | PDI | M(X) (mole %) | P(X) (mole %) | HDDMA Flow Rate (g/min) |
|---|---|---|---|---|---|---|
| 7A | 1:45 | 5.42 | 11.18 | 4.6 | 95.2 | 2.9 |
| 7B | 2:00 | 6.52 | 11.83 | 1.4 | 98.2 | 2.9 |
| 7C | 2:15 | 6.36 | 12.77 | 0.7 | 98.9 | 2.9 |
| 7D | 2:30 | 6.40 | 9.90 | 1.4 | 98.2 | 4 |
| 7E | 2:45 | 6.36 | 8.52 | 1.7 | 97.9 | 4 |
| 7F | 3:20 | 6.58 | 7.89 | 3.3 | 96.3 | 4 |
| 7G | 3:30 | 6.56 | 11.00 | 3.9 | 95.6 | 5 |
| 7H | 3:40 | 6.50 | 10.87 | 3.4 | 96.1 | 5 |
| 7I | 4:00 | 6.46 | 8.95 | 1.8 | 97.8 | 6 |
| 7J | 4:10 | 6.52 | 8.87 | 4.7 | 94.8 | 6 |

P(X) refers to mole % polymeric components.
M(X) refers to mole % unreacted monomeric components

Example 8

Poly(2-Ethylhexyl Acrylate-Acrylic Acid-Butyl Acrylate) EHA-AA-BA Copolymers—4L STR This example illustrates that a free radical polymerization mechanism can be employed in this combinatorial approach.

An initiator solution was prepared by mixing 2.16 g of Vaso 52 with 1797.84 g of O₂-free EHA and stirring at room temperature for about 30 minutes, while being externally cooled by placement in a pail containing dry ice. A solution of EHA/AA and chain transfer reagent was prepared by mixing 37,547 g of EHA, 3,894 g of AA and 34.6 of t-dodecyl mercaptan (t-DDM) under a nitrogen atmosphere and sparging the mixture for 30 minutes. The EHA/AA/ t-DDM mixture (pumped via a reciprocating piston pump at a rate of 115.2 g/min) was preheated to 65° C. by passage through an external heat exchanger and the EHA/Vaso 52 stream (pumped via a reciprocating piston pump at a rate of 5 g/min) were fed into zone 1 of the STR. When the initiator solution contacted the monomer mixture an exotherm resulted. The reaction temperature was not controlled by external measures. The materials flowed through the first four facilitated by stirring paddles along the reaction path. The temperature of the reaction mixture in each of the end of the 4 zones of the STR was measured to be: #1=155° C., #2=142° C., #3=137° C., #4=113° C. This polymerization continued to about 60% completion by the end of zone 4 thereby forming an EHA/AA copolymer. The total residence time for these reactions was about 33 minutes.

After the reaction was run under these conditions for approximately an hour, the butyl acrylate (BA) flow was initiated. Butyl acrylate was supplied to the mid-point of zone 1 (pumped via a reciprocating piston pump at a rate of 20 g/min), increasing the total monomer flow and decreasing the residence time to 28 minutes. Periodic changes in various flows were made according to Table 8A shown below.

TABLE 8A

Process Flow Rates as a function of time

| Example | Time of Day (Hr:min) | EHA/AA Flow (g/min) | BA Flow (g/min) | Total Flow (BA + EHA/AA) (g/min) | Residence Time (min) |
|---|---|---|---|---|---|
| 8A1 | 12 | 116 | 0 | 116 | 33 |
| 8A2 | 1:36 | 116 | 20 | 136 | 28 |
| 8A3 | 1:50 | 104 | 20 | 124 | 31 |
| 8A4 | 2:22 | 96 | 20 | 116 | 33 |
| 8A5 | 2:35 | 96 | 28 | 124 | 31 |
| 8A6 | 2:50 | 88 | 28 | 116 | 33 |
| 8A7 | 3:00 | 81 | 34 | 115 | 33 |
| 8A8 | 3:10 | 62 | 46 | 108 | 35 |
| 8A9 | 3:15 | 62 | 51 | 113 | 34 |

Materials were sampled at various time intervals and the bulk materials were collected in 5 gallon containers. The example was tested for Mn, PDI, and Relative incorporation of EHA, AA and BA by $^1$H NMR. Results are shown in Table 8B.

TABLE 8B

Quantitative results of the EHA/AA/BA copolymers

| Ex. | Time of Day (HR:min) | P(EHA) (mol %) | P(AA) (mol %) | P(BA) (mol %) | M(EHA) (mol %) | M(BA) (mol %) | M(AA) (mol %) | Mn (×10$^4$) | PDI |
|---|---|---|---|---|---|---|---|---|---|
| 8B1 | 2:10 | 40.1 | 10.0 | 12.0 | 26.1 | 5.7 | 6.1 | 10.8 | 3.12 |
| 8B2 | 2:25 | 42.0 | 7.6 | 12.6 | 26.4 | 5.8 | 5.5 | 10.6 | 2.89 |
| 8B3 | 2:40 | 42.4 | 8.6 | 10.1 | 26.7 | 6.8 | 5.5 | 9.81 | 3.12 |
| 8B4 | 2:55 | 41.0 | 9.9 | 10.5 | 26.2 | 6.3 | 6.2 | 9.92 | 3.02 |
| 8B5 | 3:10 | 40.6 | 11.0 | 10.3 | 25.4 | 7.6 | 5.0 | 10.3 | 3.03 |
| 8B6 | 3:15 | 47.8 | 7.2 | 13.9 | 24.3 | 3.8 | 3.0 | 10.2 | 3.18 |
| 8B7 | 3:20 | 43.4 | 9.0 | 13.7 | 24.2 | 6.0 | 3.7 | 10.4 | 3.05 |
| 8B8 | 3:25 | 41.3 | 9.4 | 13.6 | 25.5 | 6.1 | 4.2 | 11.7 | 2.74 |
| 8B9 | 3:30 | 42.1 | 7.9 | 18.6 | 22.1 | 6.0 | 3.3 | 10.3 | 3.11 |
| 8B10 | 3:35 | 45.5 | 6.3 | 18.0 | 21.6 | 5.6 | 3.0 | 11.3 | 2.89 |
| 8B11 | 3:40 | 43.4 | 7.6 | 18.4 | 21.2 | 6.6 | 2.8 | 11.0 | 3.08 |
| 8B12 | 3:45 | 44.6 | 3.5 | 24.9 | 17.5 | 7.1 | 2.5 | 11.5 | 3.13 |

Unlike examples 1-7 this polymerization is not living, hence a statistically random copolymer is produced in this reaction. The non-linear increase in butyl acrylate content is a result of changes in the residence time for these reactions as a result of changes in the net flow rate (see Table 8A.).

Example 9

Octene/Propylene Copolymer-Shrouded Vessel Extruder

This example illustrates another polymerization chemistry (coordination polymerization) employed in this combinatorial approach. Random copolymers of Ziegler-Natta polymerizable monomers were produced at varying copolymer levels with a continuous process. The example also illustrates another class of plug flow reactor, that of a shrouded extruder vessel.

A catalyst slurry was prepared by mixing 99.0 g of Lynx 715 Ziegler-Natta catalyst with 9926.7 g of octene. The catalyst slurry was contained in a stirred vessel and metered into the first zone of the extruder by a peristaltic pump.

A co-catalyst solution was prepared by mixing 10,094. g of octene with 116.7g of a 25 wt. % solution of triethyl aluminum in heptane and was pressure fed into the first zone of the extruder. The main octene stream was pressure fed into the first zone of the extruder. A propylene cylinder from Matheson gas was used to pressure feed propylene into the first zone of the extruder using the pressure in the cylinder. The propylene went through a Matheson gas purification system (Model 6406-A) before it was pressure fed into the first zone of the extruder.

The barrel section of each of 16 zones was kept at a temperature of 30° C. The residence time was 11 minutes and the extruder RPM was set at 40.

Three different conditions were run for this experiment to vary the propylene content in the propylene/octene copolymer. The goal was to run at three different propylene levels (10, 15, and 20%). The conditions and results of this experiment are displayed in Table 9.

TABLE 9

Octene/propylene copolymers Process Flow Rates and Quantitative results

| Example | Catalyst (g/min) | Co-catalyst (g/min) | Octene-1 (g/min) | Propylene (g/min) | propylene* (wt %) | octene-1 (wt %) | I.V. (dL/g) |
|---|---|---|---|---|---|---|---|
| 9A | 53.0 | 54.0 | 48.7 | 17.2 | 1 | 99 | 0.93 |
| 9B | 53.7 | 54.7 | 39.6 | 25.9 | 12 | 88 | 0.64 |
| 9C | 54.5 | 55.5 | 30.5 | 34.8 | 21 | 79 | 0.58 |

*From NMR

Various modifications and alterations that do not depart from the scope and spirit of this invention will become apparent to those skilled in the art. This invention is not to be unduly limited to the illustrative embodiments set forth herein.

We claim:

1. A continuous method of making a combinatorial library of materials comprising:
   providing a plug flow reactor,
   introducing one or more components into the plug flow reactor, and
   introducing or changing over time in the plug flow reactor to which the one or more components were added at least one variable affecting the one or more components to produce a combinatorial library of materials;
   wherein the variable is selected from the group consisting of the type of component or starting material, the concentration of a component or starting material, the pressure in the reactor, the amount of actinic radiation supplied to a reaction zone, the type of energy supplied to a reaction zone, the type of component mixing, the degree of component mixture, the chemical reaction of components, the residence time, and/or where and/or when additional components are introduced into the plug flow reactor;
   and wherein the combinatorial library of materials comprises at least one of the following: small-molecule materials, biological materials, biologically active materials, block copolymers, graft copolymers, tapered or gradient polymers, branched polymers, star polymers, comb polymers, network polymers, end-functional polymers, site specific functional polymers, and/or telechelic polymers.

2. The method of claim 1 further comprising evaluating the materials of the library.

3. The method of claim 1 wherein the plug flow reactor comprises a stirred tube reactor.

4. The method of claim 1 wherein the plug flow reactor comprises an extruder.

5. The method of claim 1 wherein the plug flow reactor comprises a static mixer.

6. The method of claim 1 wherein the plug flow reactor comprises a stirred tube reactor in tandem with an extruder.

7. The method of claim 1 wherein the changing of a variable is performed in a continuous manner.

8. The method of claim 1 wherein the changing of a variable is performed in a stepwise manner.

9. The method of claim 1 wherein the variable is physical mixing of components.

10. The method of claim 1 wherein the chemical reaction of components is a polymerization method consisting of at least one of step-growth, chain-growth, and coordination.

11. The method of claim 10 wherein the coordination reaction uses a Ziegler Natta or metallocene catalyst.

* * * * *

UNITED STATES PATENT AND TRADEMARK OFFICE
CERTIFICATE OF CORRECTION

PATENT NO. : 7,514,263 B2
APPLICATION NO. : 09/824330
DATED : April 7, 2009
INVENTOR(S) : James M. Nelson et al.

It is certified that error appears in the above-identified patent and that said Letters Patent is hereby corrected as shown below:

On the Title Page, item (75), in Column 1, under (Inventors)
Line 1, delete "Rosevill" and insert -- Roseville --, therefor.

On Page 2, in Column 2, under (Other Publications)
Line 12, delete "Througyhput" and insert -- Throughput --, therefor.

Column 2
Line 1, delete "chan" and insert -- can --, therefor.

Column 3
Line 10, after "251)" insert -- ; --.

Column 4
Line 15, delete "nonsteady" and insert -- non-steady --, therefor.
Line 53, delete "maybe" and insert -- may be --, therefor.

Column 5
Line 38, delete "V," and insert -- UV, --, therefor.
Line 45, delete "impedence" and insert -- impedance --, therefor.

Column 6
Line 7, delete "opening,;" and insert -- opening; --, therefor.

Column 7
Line 25, delete "catalyts," and insert -- catalyst, --, therefor.
Line 49, delete "adsorbants," and insert -- adsorbents, --, therefor.

Column 11
Lines 1-3, delete "reaction mixture can be used as reactor 40; nevertheless, a counter-rotating twin-screw extruder is the preferred type of extruder." and insert the same on Col. 10, Line 67 after "the" as continuation of the same paragraph.

Column 14
Line 21, delete "($t_{60}$)" and insert -- ($t_\alpha$) --, therefor.
Line 26, delete "$t_{60}$" and insert -- $t_\alpha$ --, therefor.

Column 15
Line 66, delete "Coming" and insert -- Corning --, therefor.

UNITED STATES PATENT AND TRADEMARK OFFICE
CERTIFICATE OF CORRECTION

PATENT NO. : 7,514,263 B2
APPLICATION NO. : 09/824330
DATED : April 7, 2009
INVENTOR(S) : James M. Nelson et al.

It is certified that error appears in the above-identified patent and that said Letters Patent is hereby corrected as shown below:

Column 18
Line 40, delete "burgandy" and insert -- burgundy --, therefor.
Line 48, after "analysis" insert -- . --.

Column 19
Line 45, delete "burgandy" and insert -- burgundy --, therefor.

Column 20
Line 32, delete "change unexpected" and insert -- change, unexpected --, therefor.
Line 50, delete "#2 30°C.," and insert -- #2= 30°C., --, therefor.
Line 60, delete "burgandy" and insert -- burgundy --, therefor.

Column 22
Line 10, delete "zone 3 zone 3 purified" and insert -- zone 3, purified --, therefor.

Column 23
Line 7, delete "30C." and insert -- 30°C. --, therefor.
Line 22, delete "100C." and insert -- 100°C. --, therefor.

Column 24
Line 26, delete "exothern" and insert -- exotherm --, therefor.

Column 25
Line 31, delete "diphenyhexyl" and insert -- diphenylhexyl --, therefor.

Signed and Sealed this

Sixteenth Day of June, 2009

JOHN DOLL
*Acting Director of the United States Patent and Trademark Office*